US012595410B2

(12) United States Patent
Bao et al.

(10) Patent No.: US 12,595,410 B2
(45) Date of Patent: Apr. 7, 2026

(54) LUMINESCENT DIAMOND

(71) Applicant: Schlumberger Technology Corporation, Sugar Land, TX (US)

(72) Inventors: Yahua Bao, Orem, UT (US); J. Daniel Belnap, Lindon, UT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 605 days.

(21) Appl. No.: 18/005,115

(22) PCT Filed: Jul. 14, 2021

(86) PCT No.: PCT/US2021/041509
§ 371 (c)(1),
(2) Date: Jan. 11, 2023

(87) PCT Pub. No.: WO2022/015780
PCT Pub. Date: Jan. 20, 2022

(65) Prior Publication Data
US 2023/0257648 A1 Aug. 17, 2023

Related U.S. Application Data

(60) Provisional application No. 63/051,708, filed on Jul. 14, 2020.

(51) Int. Cl.
*C09K 11/65* (2006.01)
*C01B 32/28* (2017.01)

(52) U.S. Cl.
CPC .............. *C09K 11/65* (2013.01); *C01B 32/28* (2017.08)

(58) Field of Classification Search
CPC ......... C09K 11/65; C01B 32/28; C01B 32/25; B01J 3/067; B01J 3/065; B01J 2203/0655; B01J 2203/0685
See application file for complete search history.

(56) References Cited

U.S. PATENT DOCUMENTS 8,168,413 B2 5/2012 Chang
9,465,035 B2 10/2016 Shirakawa
(Continued)

FOREIGN PATENT DOCUMENTS

CN 1431928 A 7/2003
CN 107651858 A 2/2018
(Continued)

OTHER PUBLICATIONS

Boudou, J. P. et al., "High yield fabrication of fluorescent nanodiamonds", Nanotechnology 20, 2009, 12 Pages.
(Continued)

*Primary Examiner* — Matthew E. Hoban
*Assistant Examiner* — Lynne Edmondson
(74) *Attorney, Agent, or Firm* — Kyle R. Miiller

(57) ABSTRACT

Luminescent diamond is made by subjecting a volume of diamond grains to high-pressure/high-temperature conditions with or without a catalyst or pressure transfer media to cause the grains to undergo plastic deformation to produce nitrogen vacancy defects, increasing the luminescent activity/intensity of the resulting diamond material. The consolidated diamond material may be further treated to further increase luminescent activity/intensity including reducing the consolidated diamond material to diamond particles, heat treatment in vacuum, and/or air heat treatment. The resulting luminescent diamond particles display a level of luminescence intensity greater than that of conventional luminescent nanodiamond, and may be functionalized for use in biological applications.

21 Claims, 10 Drawing Sheets

(56) References Cited

U.S. PATENT DOCUMENTS

| | | | | |
|---|---|---|---|---|
| 10,105,824 | B2 | 10/2018 | Bao | |
| 12,275,005 | B2 * | 4/2025 | Bao | B01J 3/067 |
| 12,325,814 | B2 * | 6/2025 | Belnap | C09K 11/65 |
| 12,421,120 | B2 * | 9/2025 | Belnap | C01B 32/28 |
| 2003/0044613 | A1 | 3/2003 | Cho | |
| 2005/0019114 | A1 | 1/2005 | Sung | |
| 2009/0127506 | A1 | 5/2009 | Twitchen | |
| 2010/0126406 | A1 | 5/2010 | Yan | |
| 2010/0181534 | A1 | 7/2010 | Shenderova | |
| 2011/0241266 | A1 | 10/2011 | Wardoyo | |
| 2013/0291443 | A1 | 11/2013 | Naidoo | |
| 2015/0033637 | A1 | 2/2015 | Naidoo | |
| 2015/0183091 | A1 | 7/2015 | Bao | |
| 2019/0292451 | A1 * | 9/2019 | Shenderova | C09K 11/025 |
| 2020/0179888 | A1 | 6/2020 | Vila Anton | |
| 2022/0056337 | A1 | 2/2022 | Belnap | |

FOREIGN PATENT DOCUMENTS

| | | | |
|---|---|---|---|
| CN | 108918485 | A | 11/2018 |
| JP | 2006172718 | A | 6/2006 |
| KR | 1020040002684 | A | 1/2004 |
| KR | 100687773 | B1 | 2/2007 |
| WO | 9323204 | A1 | 11/1993 |
| WO | 2019209702 | A1 | 10/2019 |

OTHER PUBLICATIONS

Cook, M. W. et al., "Trends and recent developments in the material manufacture and cutting tool application of polycrystalline diamond and polycrystalline cubic baron nitride", International Journal of Refractory Metals Hard Materials 18 (2000) 147-152.
Davey et al., An investigation of plastic deformation in sintered diamond compacts using photoluminescence spectroscopy. Journal of Materials Science Letters, 1984, 3, pp. 1090-1092.
Evans, T. et al., "Photoluminescence studies of sintered diamond compacts", Journal of Material Science, 1984, pp. 2405-2414.
Ikeda, K. et al., "Optical properties of ultrapure nano-polycrystalline diamond", Japanese Journal of Applied Physics, 2016, vol. 55, Article No. 120306, pp. 120306-1-120306-4.
Kanda, H. et al., "Change of luminescence character of Ib diamonds with HPHT treatment", Diamond and related materials, 2001, vol. 10, pp. 1665-1669.
Kumar, R. et al., "Purification method dependent fluorescence from nitrogen-vacancy (NV) centers of nano-diamonds", RSC Advances, 2016, vol. 6, No. 52, pp. 47164-47173.
Itoh, H. et al., "Effects of starting carbon and solvent-catalyst on the reaction sintering of diamond", Journal of Material Science 23, 1988, pp. 2877-2881.
Qian, J. et al., "Polycrystalline diamond cutters sintered with magnesium carbonate in cubic anvil press", International Journal of Refractory Metals and Hard Materials, 2012, vol. 31, pp. 71-75.
Yushin, G. N. et al., "Effect of sintering on structure of nanodiamond", Diamond Related Materials 14, 2005, pp. 1721-1729.
First Chinese Office Action issued in Chinese Patent Application No. 2020800170928 dated Jun. 27, 2022, 13 pages with English partial translation.
Extended Search Report issued in European Patent Application No. 20740949.1 dated Sep. 28, 2022, 10 pages.
First Office Action issued in Japan Patent Application No. 2021541278 dated Jan. 9, 2024, 7 pages with English translation.
Second Office Action issued in Japan Patent Application No. 2021541278 dated Jul. 1, 2024, 7 pages with English translation.
International Search Report and Written Opinion issued in International Patent application PCT/US2020/013664 on May 12, 2020, 12 pages.
International Search Report and Written Opinion issued in International Patent application PCT/US2021/041509 on Nov. 1, 2021, 11 pages.
First Chinese Office Action issued in Chinese Patent Application No. 201800552630 dated Apr. 18, 2024, 15 pages with English translation.
Second Chinese Office Action issued in Chinese Patent Application No. 201800552630 dated Jan. 17, 2025, 16 pages with English translation.

* cited by examiner 1200
1202
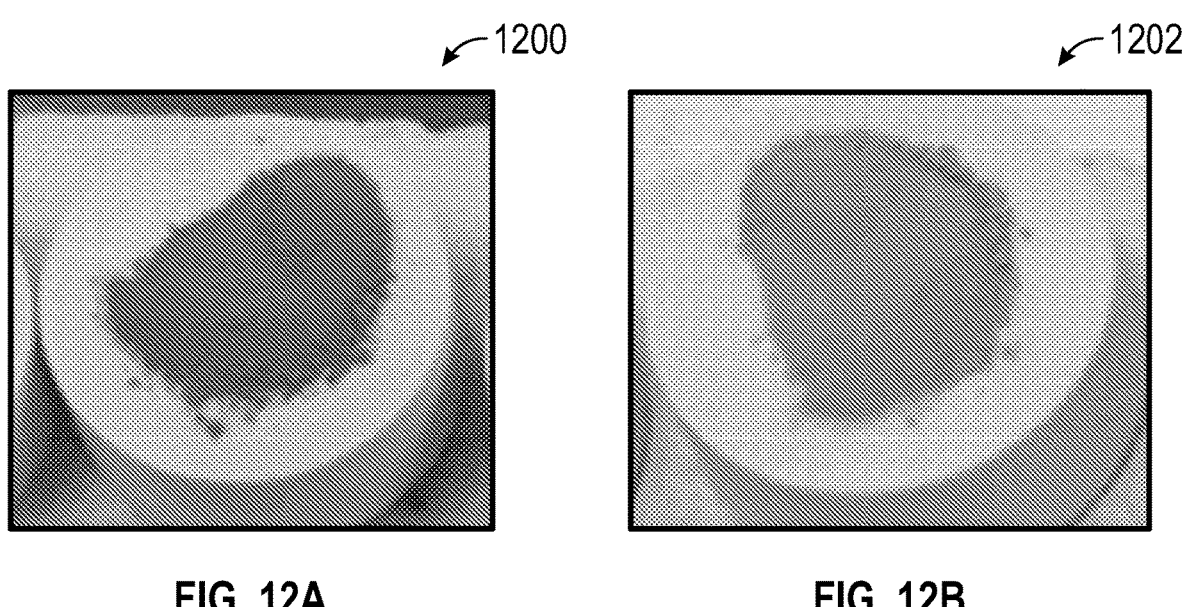
FIG. 12A          FIG. 12B
1300
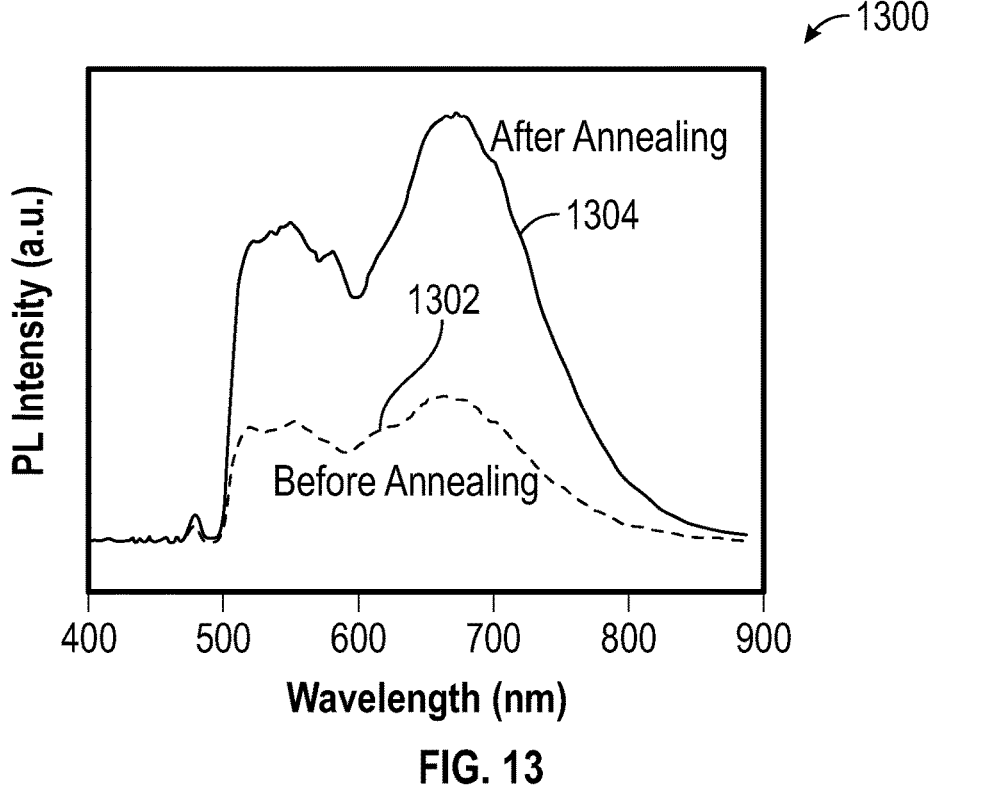
FIG. 13

1402            1400

1500

LUMINESCENT DIAMOND

CROSS REFERENCE TO RELATED APPLICATION

This application is a National Stage entry of International Patent Application No. PCT/US2021/041509, filed on Jul. 14, 2021, which claims the benefit of U.S. Provisional Application No. 63/051,708, entitled "LUMINESCENT DIAMOND," filed Jul. 14, 2020, the disclosure of which is hereby incorporated herein by reference.

BACKGROUND

Laser-infused fluorescence is a known technique adopted for better understanding how biological systems function at a molecular level through the probing of biomolecules individually for observation. In an example, laser-infused fluorescence may be applied to image and track a single molecule or particle in a biological cell or the like, e.g., in-vivo biological sensors for internal organ mapping, cell imaging, and the like. One type of substance used for laser-infused fluorescence is luminescent nanodiamond, which is nano-sized diamond particles or grains that has been developed to emit light when excited by a light source within a desired wavelength as called for by the end-use application.

SUMMARY

Luminescent diamond and methods of making the same are disclosed herein, and include subjecting a volume of precursor diamond grains to a high-pressure/high-temperature (HPHT) condition to cause the grains to undergo plastic deformation to produce nitrogen vacancy defects in the diamond grains, that increases the luminescent activity and intensity of the resulting diamond material as compared to that of the precursor diamond grains. In some embodiments, the consolidated diamond material may have a luminescence intensity that is at least about 2 orders of magnitude greater than a luminescence intensity of the precursor diamond powder. In some embodiments, a catalyst material may or may not be included with the volume of diamond grains, in which case the resulting consolidated diamond material may be a body of mechanically combined diamond grains characterized by substantially no intercrystalline bonded diamond, or semi-sintered diamond grains characterized by some intercrystalline bonded diamond along with mechanically combined diamond grains, or may be a fully-sintered polycrystalline diamond body characterized by a large degree of intercrystalline bonded diamond and very little mechanically combined diamond grains.

In some embodiments where a polycrystalline diamond body is produced, the amount of catalyst material used may be less than an amount useful to produce a fully-sintered polycrystalline body. In some embodiments, the precursor diamond grains are combined with a catalyst material that may be a metal solvent catalyst to promote intercrystalline diamond bonding under HPHT conditions. In some embodiments, the precursor diamond grains may be combined with a pressure transfer media that does not promote intercrystalline diamond bonding under HPHT conditions. In some embodiments, the pressure transfer media may be selected from materials that catalyze diamond growth but do not promote direct diamond bonding. In some embodiments, the pressure transfer media may be selected from materials that do not catalyze diamond growth, do not promote direct diamond bonding, and that facilitate formation of a diamond body characterized by mechanically interlocked diamond. In some embodiments, using a pressure transfer media operates during the HPHT process to both promote desired plastic deformation of the diamond particles and fills gaps between the diamond particles to thereby minimize or prevent unwanted diamond graphitization. In some embodiments, the pressure transfer media may be soluble to water, acid or base solution for removal from the diamond material after HPHT processing by water, acid or base washing.

In some embodiments, luminescent diamond materials as disclosed herein display a level of luminescence intensity in one or a combination of wavelength spectrums that is greater than that of a precursor diamond material used to form the luminescent diamond materials. In some embodiments, the luminescent diamond materials display luminescence in one or a combination of the violet-blue, blue, red, and/or green wavelength spectrums.

In some embodiments, the diamond material formed by the HPHT process may be treated to further increase the level of luminescence intensity of the diamond material. In some embodiments, such treatment may be separate from and precede sizing the diamond material to diamond particles. In some embodiments, the diamond material formed by the HPHT is subjected to a reduction or sizing process to form diamond particles having a desired particle size. In some embodiments, the diamond material may be sized to have nanometer sized diamond particles. In some embodiments, during the sizing reduction, the diamond material increases the surface area that is exposed to the radiation source producing the luminescence thereby increasing the resulting intensity, and may also undergo further plastic deformation, potentially resulting in a further increase in luminescence intensity when compared to the consolidated diamond material. In some embodiments, the sized diamond particles have a luminescence intensity that is at least about 10 percent greater than that of the diamond material formed during the a high-pressure/high-temperature process. In some embodiments, another method to increase the luminescence activity is to repeat the HPHT process on diamond material previously HPHT treated, such as heat treatment in an air or inert atmosphere, heat treatment in an oxygen atmosphere, or combinations involving a controlled partial pressure of oxygen. The sized and heat treated luminescent diamond particles may be functionalized to adapt the same for a desired end use application. In some embodiments, luminescent diamond as disclosed herein display a comparable or higher level of luminescence intensity than conventional luminescent diamond and are made in a more efficient manner as contrasted with such conventional luminescent diamond.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

These and other features and advantages of luminescent nanodiamond and methods of making the same as disclosed herein will be appreciated as the same becomes better understood by reference to the following detailed description when considered in connection with the accompanying drawings where:

FIGS. 12A and 12B are photographs of a luminescent diamond material as disclosed herein, formed by HPHT processing using a chloride pressure transfer media, before and after being subjected to an annealing process;

FIG. 13 is a graph illustrating the relative luminescence intensity and wavelength information for the luminescent diamond materials of FIGS. 12A and 12B;

DETAILED DESCRIPTION

Figure 1:
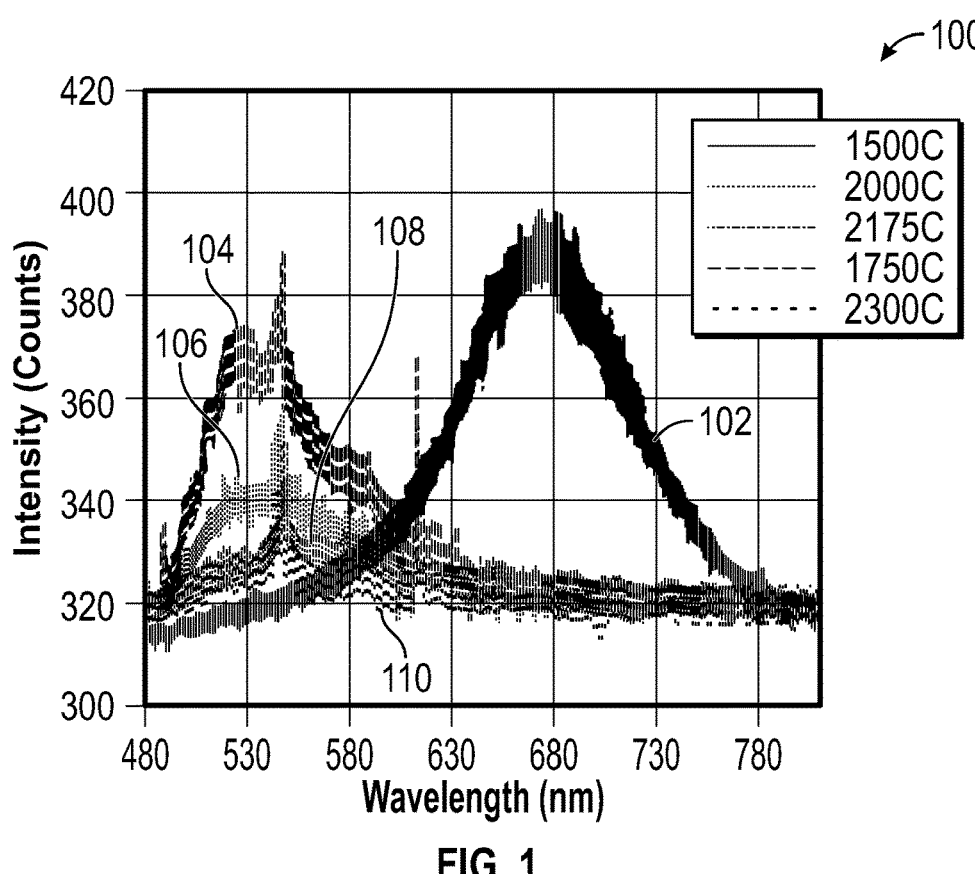
FIG. 1 is a graph illustrating luminescence intensity and wavelength information for diamond powder as disclosed herein when subjected to different elevated temperatures.

In some embodiments, luminescent diamond (e.g., photoluminescent diamond) and methods for making the same as disclosed herein is engineered in a manner that increases manufacturing efficiency and manufacturing volume to thereby improve affordability and availability of the substance for end-use applications including and not limited to the biological uses briefly noted above. Further, in some embodiments, luminescent diamond as prepared in accordance with the principles disclosed herein display a level of luminescence intensity that is similar to or greater than that of conventional luminescent diamond, to thereby present an opportunity for expanding the range of potential end-use applications for such material. For purposes of clarity, in some embodiments luminescent diamond as disclosed herein is formed initially by consolidation and compaction of pre-existing diamond grains, forming a luminescent active sintered body or slug (characterized by a high degree of intercrystalline diamond bonding), or forming a mechanically combined semi-sintered body or slug (characterized by substantially no intercrystalline diamond bonding). In such condition, the consolidated material may be referred to as luminescent diamond. During a subsequent procedure the luminescent diamond is reduced in size as called for by a particular end use, and in some embodiments, the resulting diamond particles or grains are nano-scale in size. In some embodiments, the reduced sized luminescent diamond may be exclusively nano-size particles or may include a combination of nano-size particles with coarser diamond particles. The term "nanodiamond" as used herein is understood to refer to luminescent diamond including nano-size diamond particles, i.e., having an average size between about 1 to 1000 nm. While the existence of luminescent nanodiamond may be known, the methods and techniques currently used to make such luminescent nanodiamond are expensive, energy and time intensive, adding to not only the cost of the substance but limiting the availability of the same. In some embodiments, by making luminescent diamond as disclosed herein, cost, energy, and/or time may be reduced.

In some embodiments, luminescent diamond as disclosed herein may be formed by combining a volume of precursor diamond grains, which may be in the form of natural and/or synthetic diamond grains, and placing the volume of diamond grains into a can or container as conventionally used for diamond grain consolidation. In some embodiments, the diamond grains may have an average grain size of from about 1 to 1000 μm, from about 1 to 100 μm, or from about 10 to 50 μm. In other embodiments, the initial diamond grain or powder sizes may extend into the submicron or nanodiamond range, as previously described. In some embodiments, nanosized powders formed either by mechanical crushing of conventional diamond powders or detonation processes can be employed in a similar manner. The conventional diamond powders can either be of synthetic or natural origin, however synthetic diamond powder generally has a higher intrinsic nitrogen content, which, along with an adjacent vacancy, makes the diamond luminescent active. In some embodiments, it is desired that the starting diamond material have an intrinsic amount of nitrogen impurity that is consistent with that found in diamond designated as type 1b, e.g., about 50 ppm nitrogen or higher. Nanopowders synthesized through shock synthesis generally have higher intrinsic nitrogen content as well. In some embodiments, the container and its contents are subjected to a high-pressure/high-temperature (HPHT) consolidation process using conventional press equipment for making polycrystalline diamond. In some embodiments, the volume of diamond grains is placed into the can or container, and the can or container may or may not be sealed and is placed within a HPHT press and subjected to desired sintering pressure and temperature conditions. In some embodiments, the HPHT process temperature may be in the range of from about 1300 to 2500° C., and the process pressure may be from about 3.0 GPa to about 10 GPa. In some embodiments, the volume of diamond grains is substantially free of any catalyst material, so that diamond material resulting from the HPHT process is not fully sintered, but rather is in the form of a semi-sintered slug or body including diamond grains that are mechanically combined together by frictional contact, cold welding, diamond self-diffusion and the like. In some embodiments, producing a diamond material that is not fully sintered, i.e., that is semi-sintered and not characterized by a network of bonded-together diamond grains making use of a conventional metal solvent catalyst, the relative transparency of the same as contrasted with a sintered polycrystalline diamond body is improved, and the transparency may improve the intensity of luminescent emission therefrom. There may also be graphite that forms in the porous regions of the semi-sintered body, which may decrease the intensity of the luminescence. In such case it is desired that the graphitic material be partially of completely removed as part of the manufacturing process.

During the HPHT process, it has been discovered that at least a portion of the volume of precursor diamond grains undergoes plastic deformation. In some embodiments, the extent of the HPHT consolidation process is such to cause sufficient plastic deformation in the diamond grains to create nitrogen vacancy (N-V and/or N-V-N) defects and/or N3 optical centers in the diamond grains that operate to make the diamond grains luminescent active. Plastic deformation of diamond particles during HPHT is believed to create vacancies as deformation mechanisms such as crystallographic dislocation motions become active, which vacancies can in turn combine with nitrogen impurities to form the nitrogen vacancy (N-V and/or N-V-N) defects and/or N3 optical centers which create the desired luminescent activity. In some embodiments, this occurs during conventional sintering of polycrystalline diamond with metal catalysts (such as cobalt that function to promote intercrystalline diamond bonding during the HPHT process) or non-metal catalysts/pressure transfer media (such as carbonates and chlorides that do not promote intercrystalline diamond bonding during the HPHT process). In some embodiments, the diamond grains resulting from the HPHT process may be heavily plastically deformed with extensive N-V and/or N-V-N defects and/or N3 optical centers, and weak diamond-diamond bonding in comparison to solvent catalyst bonded polycrystalline diamond. For example, in some embodiments, it is desired that the diamond grains incur such plastic deformation giving rise to luminescent activity during the HPHT process without resulting in a fully-sintered body, thereby making the downstream process of sizing the diamond grains, by a crushing process or the like, easier and less energy intensive, as only breaking apart mechanically combined diamond grains is required.

In some embodiments, luminescent diamond as disclosed herein may be formed in a similar manner, by subjecting a volume of diamond precursor grains to an HPHT process in the presence of a catalyst material. In such embodiments, the type of catalyst materials used may be selected from the group including and not limited to Co, Fe, Ni, carbonates, Si and combinations thereof for forming polycrystalline diamond (PCD). In some embodiments, HPHT processing conditions for cobalt PCD may be within a temperature of from about 1300 to 1500° C. and pressures from about 5.0 to 7.5 GPa. In addition, cobalt PCD is typically heat treated in vacuum at temperatures of 600 to 700° C. (e.g., after PCD formation, before and/or after sizing). The amount of the catalyst material used can and will vary depending on such factors as the type of catalyst used, the amount of luminescence desired, and the particular end-use application. In biological end-use applications, for biocompatibility reasons, the presence of a metal material in the luminescent diamond may not be desired and/or permitted, in which case it may be desired to use a non-metallic catalyst. In some embodiments, using a nonmetallic catalyst results in a PCD body having relatively higher transparency or reduced opacity when compared to PCD formed using a metal solvent catalyst. In some embodiments, non-metallic catalysts useful for making luminescent diamond as disclosed herein include carbonate catalysts such as magnesium carbonate, calcium carbonate, or the like, resulting in the formation of carbonate PCD (CPCD). In some embodiments, the amount of such carbonate catalyst may be an amount sufficient to form a completely sintered carbonate PCD body, e.g., up to about 5 percent by weight based on the total weight of the carbonate catalyst and the diamond grains. Carbonate PCD appears to be intrinsically less dark/more transparent than cobalt PCD, which is believed to contribute to a higher level of luminescent emission and intensity. In some embodiments, HPHT processing of carbonate PCD may be at temperatures of from about 1700 to 3000° C. and greater than about 7.0 GPa pressure. In addition, carbonate PCD may be heat treated in an inert or vacuum environment to temperatures of about 500 to 1300° C. (e.g., after CPCD formation, before and/or after sizing). As with embodiments described earlier, HPHT processing produces plastic deformations in the diamond grains creating N-V and/or N-V-N defects and/or N3 optical centers that give rise to an increased level of luminescent activity/intensity as compared to the precursor diamond grains. Some vacancies formed during HPHT may not combine with nitrogen during the plastic deformation process and may migrate adjacent to nitrogen sites during heat treatment, creating additional N-V and/or N-V-N and/or N3 sites. The higher processing temperature and pressure conditions involved with carbonate PCD may produce a higher degree of plastic deformation in the diamond grains, and therefore produce higher luminescence activity. The use of higher heat treating temperatures may also contribute to additional N-V and/or N-V-N defects and/or N3 optical center, and therefore higher luminescent activity.

In some embodiments, it may be desired that the amount of catalyst material used be less than that useful to form a completely sintered PCD body, e.g., less than about 5 percent by weight catalyst (compared to the total weight of the diamond layer or PCD body). In such embodiments, it may be desired to produce a partially-sintered or semi-sintered PCD body that includes both intercrystalline bonded diamond and free diamond grains for the purpose of easing the downstream process of sizing the PCD body into nano-sized diamond pieces or grains as better described below. It has been discovered that PCD made in the manner disclosed herein produces a level of luminescence intensity that is greater than that of conventional luminescent nanodiamond, and for this reason, producing a product during HPHT processing that has some PCD even if not producing a fully-sintered diamond body, may provide desired increases in luminescence intensity while also making the downstream process of sizing relatively easier and less energy intensive than one involving a fully-sintered PCD body. Thus, by adjusting the amount of catalyst material, a diamond material having a desired degree of sintering that yields both a desired increase in luminescence intensity while easing the downstream sizing process may be obtained.

FIG. 1 is a graph 100 of luminescence intensity vs. wavelength that shows the effect of HPHT temperature on diamond grains without a catalyst material subjected to a pressure of approximately 13.5 ksi hydraulic pressure (7.3 to 7.7 GPa cell pressure) and a series of different temperatures from 1500 to 2300° C. Specifically, the graph illustrates the luminescent characteristics for a diamond grains subjected to the HPHT process at 1500° C. 102, diamond grains subjected to the HPHT process at 1750° C. 104, diamond grains subjected to the HPHT process at 2000° C. 106, diamond grains subjected to the HPHT process at 2175° C. 108, and diamond grains subjected to the HPHT process at 2300° C. 110. The diamond grains subjected to each of the above-noted HPHT processes had an average particle size of approximately 10 μm. N-V centers in diamond create red luminescence with a peak centered at about 675 nm, and the N-V-N centers in diamond create green luminescence with a peak centered at about 525 nm. In this test it was demonstrated that both N-V and N-V-N luminescence can be created in the same diamond material depending on the HPHT temperature. Thus, it is understood that luminescent diamond as disclosed herein may be made to display one or more different wavelengths of luminescence depending on the particular end-use application. The luminescence characteristics illustrated in FIG. 1 were produced by subjecting the diamond grains examples to 489 nm laser illumination as collected with a spectrometer. In these tests, it was shown that the HPHT temperature condition of 1500° C. produced the N-V luminescence, while the HPHT temperature conditions of 1750, 2000, 2175, and 2300° C. produced N-V-N luminescence of varying intensity.

Figure 2A:
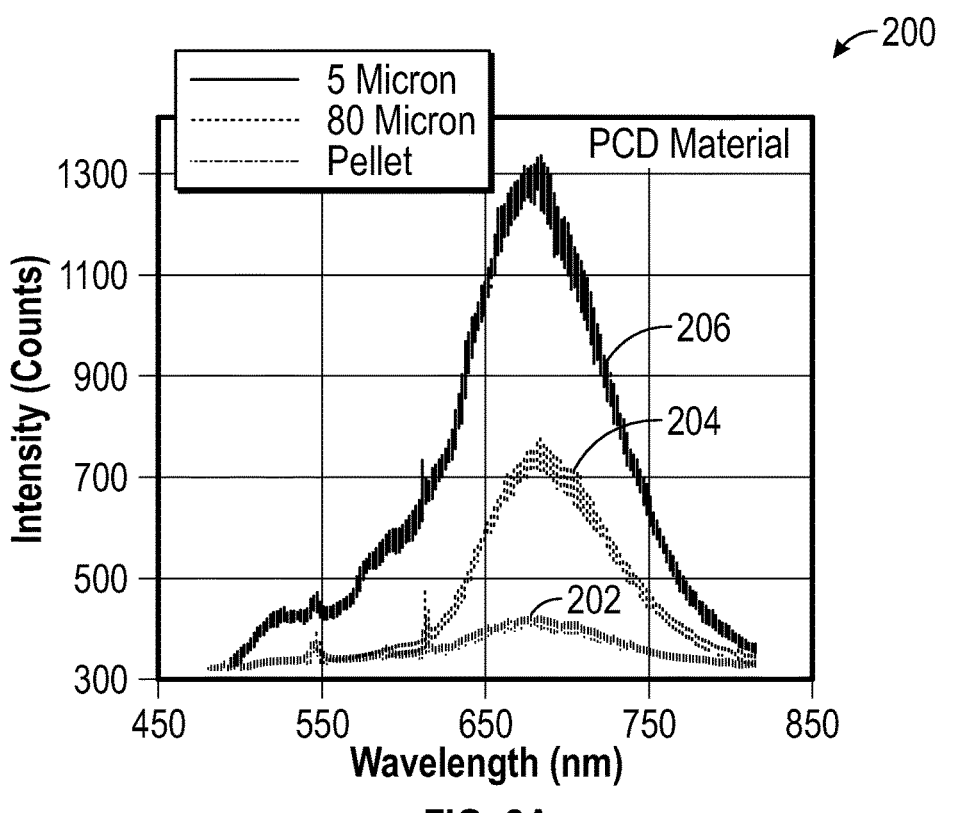
FIG. 2A is a graph illustrating luminescence intensity and wavelength information for a polycrystalline diamond material including a cobalt catalyst as disclosed herein at different particle sizes.
Figures 2B, 3:
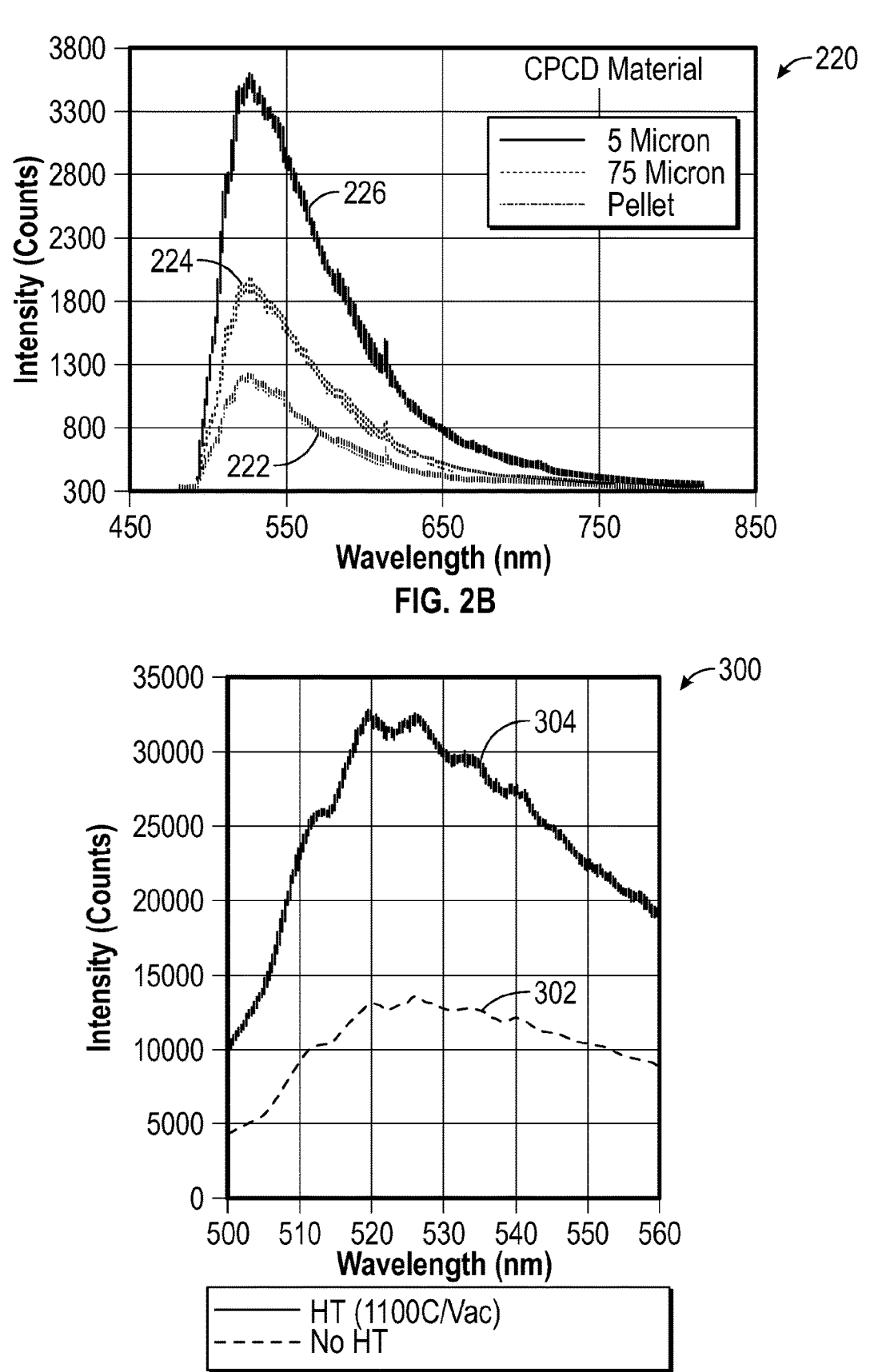
FIG. 2B is a graph illustrating luminescence intensity and wavelength information for a polycrystalline diamond material including a carbonate catalyst as disclosed herein at different particle sizes.
FIG. 3 is a graph illustrating luminescence intensity and wavelength information for a polycrystalline diamond material including a carbonate catalyst as disclosed herein with and without vacuum heat treatment.

FIGS. 2A and 2B are graphs 200 and 220 that illustrate the effect of particle size on N-V and N-V-N luminescence intensity from a 488 nm laser source. FIG. 2A shows the luminescence intensity from a conventional polycrystalline diamond (PCD) material with a cobalt catalyst used for shear cutter applications that was sintered at a condition of approximately 11 ksi (6.5 to 6.9 GPa) and 1450° C., and that had a cobalt content of approximately 10 weight percent based on the total weight of the PCD material. The PCD material was formed from diamond grains having an average particle size of approximately 17 μm. The PCD material was tested in the form of a pellet 202 having a size of approximately 1 mm, in the form of crushed PCD particles having an average size of approximately 80 μm 204, and in the form of crushed PCD particles having an average size of approximately 5 μm 206. This test demonstrated that the PCD material displayed an increase in luminescence intensity with reduced PCD material particle size.

FIG. 2B shows the luminescence intensity from a magnesium carbonate polycrystalline diamond (CPCD) material that was sintered at 13.5 ksi (7.3 to 7.7 GPa) and 2200° C., and that had a magnesium carbonate content of approximately 8 weight percent based on the total weight of the CPCD material. The CPCD material was formed from diamond grains having an average particle size of approximately 2 μm. The CPCD material was tested in the same sized forms as the PCD material discussed above. Specifically, The CPCD material was tested in the form of a pellet 222 having a size of approximately 1 mm, in the form of crushed CPCD particles having an average size of approximately 80 μm 224, and in the form of crushed CPCD particles having an average size of approximately 5 μm 226.

In both cases (FIGS. 2A and 2B) it was observed that the luminescence intensity of the respective PCD and CPCD material increased with decreasing particle size. In some embodiments, the luminescence intensity increase may be primarily the result of more surface area being exposed to the laser excitation source due to the reduced particle size. By comparison with the uncrushed pellet material, the intensity increase in both cases was shown to increase about a factor of 4. With crushing to even finer sizes it is expected that further increases in luminescence intensity are possible.

FIG. 3 is a graph 300 that illustrates the effect that heat treating the CPCD material (previously described in the context of FIG. 2B, and having an average particle size of approximately 2 μm) in conditions of approximately 1100° C. under vacuum conditions has on the luminescence intensity. The luminescence intensity of a sample of the CPCD that was not subjected to the heat treatment is shown as 302, while the luminescence intensity of a sample of the CPCD that was subjected to the above-described heat treatment prior to sizing is shown as 304. As illustrated, the luminescence intensity of the heat treated sample 304 increased by a factor of 2.2 over the non-heat treated sample 302. In some embodiments, this gain in luminescence intensity may be the result of the formation of additional N-V-N centers due to diffusive nitrogen migration during the heat treatment process. The ability to achieve increased luminescence intensity in the green wavelength with heat treatment at relatively low temperature, e.g., without having to increase the HPHT pressure, was not expected. FIG. 3 also shows the relative increase in luminescence intensity relative to raw diamond powder 306 that has not gone through a HPHT process as disclosed herein.

Figure 4:
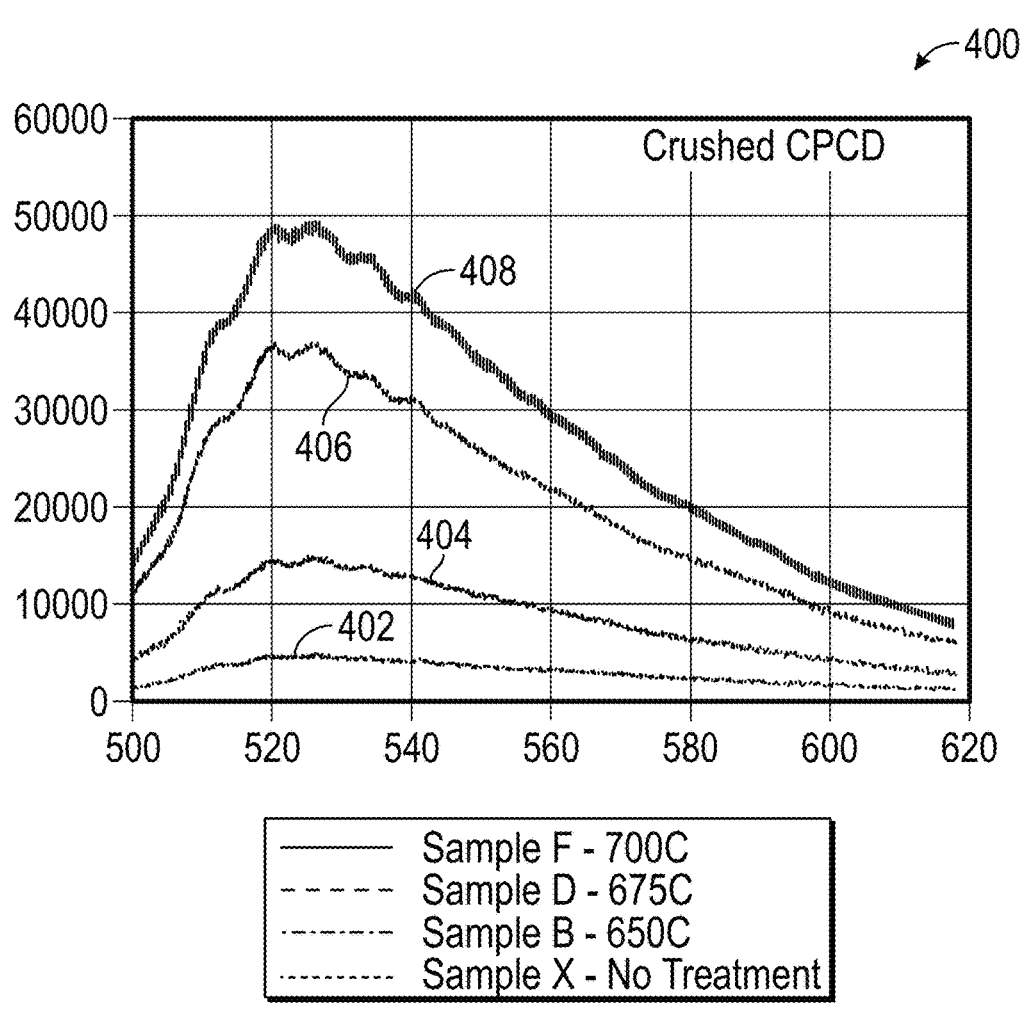
FIG. 4 is a graph illustrating luminescence intensity and wavelength information for a polycrystalline diamond material including a carbonate catalyst that has been sized into diamond particles and that has been subjected to air heat treatment at different temperatures.

FIG. 4 is a graph 400 that illustrates the effect of heat treatment of a CPCD material under oxidizing conditions. The baseline CPCD material was formed at HPHT conditions of approximately 13.5 ksi hydraulic pressure (cell pressure 7.3 to 7.7 GPa) and approximately 2200° C., and had a magnesium carbonate content of approximately 8 weight percent based on the total weight of the CPCD material. The CPCD material was formed from diamond grains having an average particle size of approximately 2 μm. The CPCD material was heat treated at 1100° C. under vacuum conditions and then crushed to approximately 5 μm. An oxidizing heat treatment was performed on the sized material in air at temperatures of approximately 650, 675, and 700° C. all for the same exposure time of approximately 120 minutes. Graph 400 illustrates the luminescence intensity for a sample not subjected to the oxidizing heat treatment 402, the sample subjected to 650° C. 404, the sample subjected to 675° C. 406, and the sample subjected to 700° C. 408. The luminescence intensity was shown to increase progressively with increasing treatment temperature such that an overall improvement in luminescence intensity of about 10 times (relative to the untreated sample) was observed. The heat treatment was accompanied by a progressive whitening of the material, which changed from a dark grey color to a near-white condition. This is believed to be due to a change in the surface chemistry on the diamond surfaces to a condition of oxygen-terminated bonds.

Figure 5:
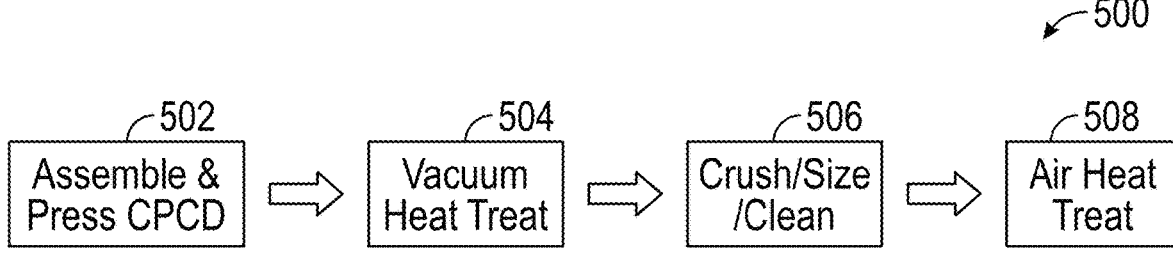
FIG. 5 is a block diagram illustrating processing steps for making luminescent diamond as disclosed herein.

FIG. 5 is a block diagram 500 illustrating processing that may be used for making luminescent diamond. In some embodiments, the processes may be carried out in a series that include two or more of the steps that are illustrated. In a first process 502, materials useful for making the luminescent diamond are combined and assembled in the manner discussed earlier which may or may not include the use of a catalyst material, and that includes subjecting the assembled or combined materials to an HPHT process, which may or may not result in the formation of a fully-sintered diamond compact. In some embodiments, the first process 502 creates vacancies in the resulting diamond material for forming nitrogen (N-V and/or N-V-N) defects and/or N3 optical centers as discussed above. In a second optional process 504 the diamond material produced from the first process 502 is subjected to a heat treatment process under vacuum conditions. As discussed above, with reference to the luminescence intensity results illustrated in FIG. 3, in some embodiments, subjecting the diamond material after the first step 502 to such heat treatment further increases the luminescence intensity of the diamond material (e.g., by 1.5 to 2.2 times a non-heat treated diamond material) by increasing the nitrogen defect (i.e., N-V-N) count. In a third optional process 506, the diamond material from process one 502 or process two 504 is reduced in size by crushing or other sizing technique as discussed above. The size of diamond particles formed during this third step may depend on the particular end-use application for the luminescent diamond material. Different diamond particle sizes of luminescent diamond materials have been disclosed above. During this third process 506, the diamond material is converted to powder. In some embodiments, reducing the size of the diamond material increases the luminescence intensity of the diamond material by 3 to 4 times due to the increased surface area of the resulting powder. In a fourth optional process 508, the diamond material from process one 502, process two 504, or process three 506 is subjected to an air heat treatment, e.g., an oxidizing heat treatment, as discussed above with reference to the luminescence intensity results illustrated in FIG. 4. In some embodiments, the air heat treatment whitens surfaces of the diamond material which is believed to be due to the formation of oxygen-terminated diamond bonds. As discussed above, with reference to the luminescence intensity results illustrated in FIG. 4, in some embodiments, subjecting the diamond material to this fourth process 508 increases the luminescence intensity by about 10 times. As noted above, in some embodiments, luminescent diamond materials as disclosed herein may be formed according to one or more of these processes, and in some embodiments using all of these processes in sequential order depending on the degree of luminescence intensity called for by the particular end-use application.

Figures 6, 7:
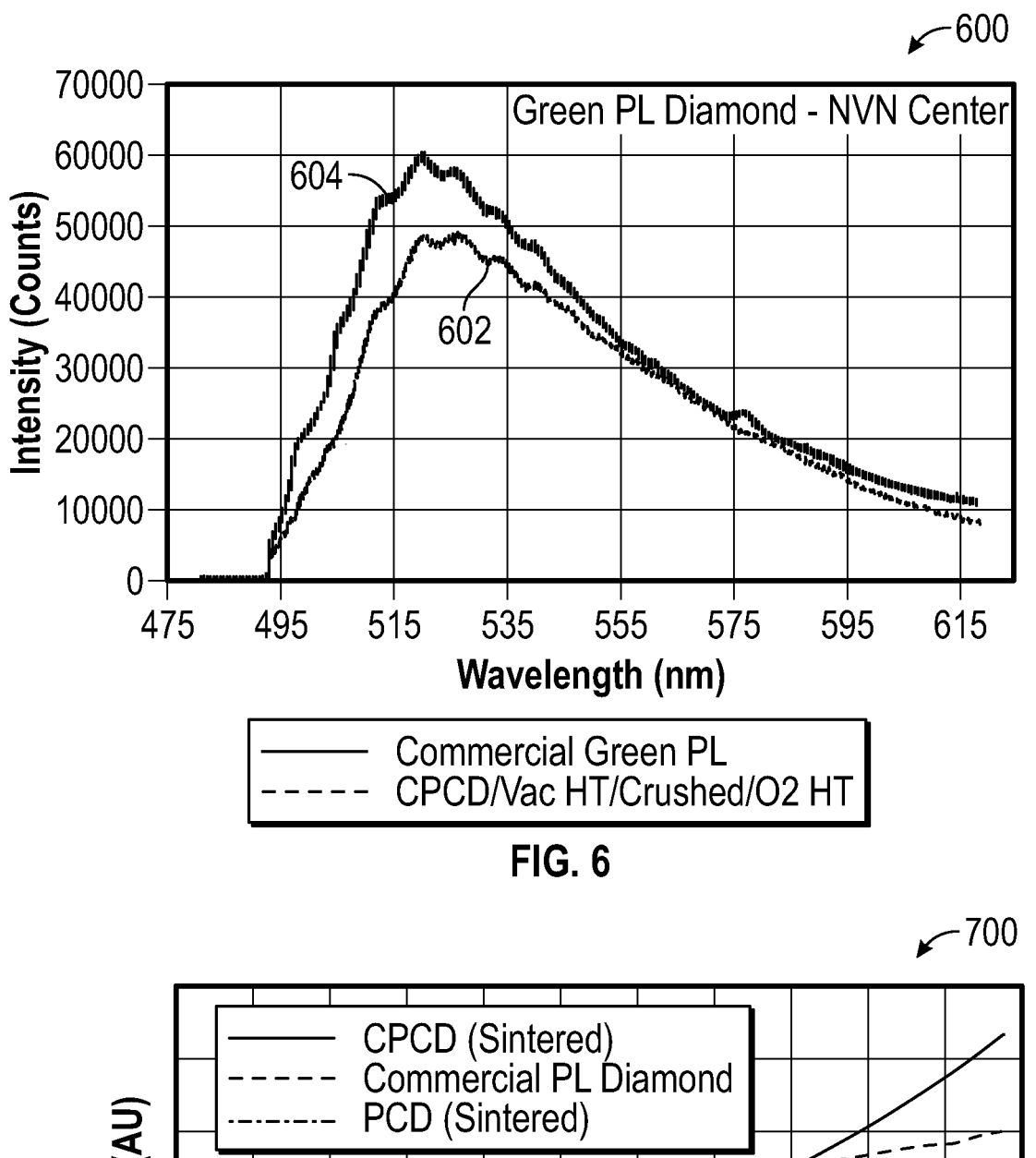
FIG. 6 is a graph illustrating luminescence intensity and wavelength information for a luminescent diamond material as disclosed herein as compared with a conventional luminescent diamond.
FIG. 7 is a graph illustrating the relative luminescence intensity of luminescent diamond materials as disclosed herein in a sintered state as contrasted with a conventional luminescent nanodiamond.

FIG. 6 is a graph that illustrates the luminescence intensity of a luminescent diamond material made using all the processes illustrated in FIG. 5. The diamond material is CPCD formed by an HPHT process at 13.5 ksi and 2200° C., where the CPCD included approximately 8 percent by weight magnesium carbonate based on the total weight of the CPCD. The CPCD material was formed from diamond grains having an average particle size of approximately 2 µm. The resulting CPCD was subjected to vacuum heat treatment at a temperature of approximately 1100° C. for a period of approximately 60 minutes (step two). The resulting heat treated CPCD was reduced in size or crushed to an average diamond particle size of approximately 5 µm in conjunction with screening coarser particles out with a −170 mesh sieve. The resulting diamond particles were then subjected to air heat treatment at a temperature of approximately 700° C. for 120 minutes. The luminescence intensity for the resulting material is shown 602 in the graph and is compared to the luminescence intensity of a commercial luminescent nanodiamond material shown as 604 in the graph having an average particle size of about 1 µm. From the graph 600, it can be seen that the luminescence results of the luminescent diamond as disclosed herein are comparable (within 15%) of the commercial luminescent nanodiamond material. Because the luminescent diamond material as disclosed herein was tested has an average particle size of 5 µm, i.e., 5 times larger than the average particle size of the commercial luminescent nanodiamond material, it is expected that with further reduction in particle size, equivalent or better N-V-N intensities can be achieved. Additional optimization/modification with heat treating steps are likewise expected to further increase luminescence intensity.

FIG. 7 is a graph 700 that illustrates the relative luminescence intensities at higher wavelengths than associated with N-V or N-V-N defects or optical centers of a conventional luminescent nanodiamond powder 702 having an average diameter of 100 nm as compared to that of fully-sintered carbonate PCD 704 and a fully-sintered cobalt PCD 706 each formed in the manner described above, as measured between light wavelengths of about 804 to 908 nm (along the x-axis), where the carbonate PCD and cobalt PCD are in the form of a fully sintered body. In this example, the cobalt PCD was formed from diamond grains having an average size of approximately 17 µm, and subjected to a pressure of approximately 11 ksi (6.5 to 6.9 GPa) and a temperature of approximately 1450° C. The resulting cobalt PCD had a cobalt content of approximately 10 percent by weight based on the total weight of the cobalt PCD. In this example, the carbonate PCD was formed from diamond grains having an average size of approximately 2 µm, and subjected to a pressure of approximately 13.5 ksi (7.3 to 7.7 GPa) and a temperature of approximately 2200° C. The resulting carbonate PCD had a magnesium carbonate content of approximately 8 percent by weight based on the total weight of the carbonate PCD. Higher wavelength luminescence is of interest for biological luminescence applications because it enables the use of lower energy illumination sources, which are less damaging to sensitive organic materials, living tissues, etc. This data was gathered by subjecting each of the diamond materials to a laser operating at a wavelength of approximately 785 nm using a spectrometer (Process Instruments Model PI-100) and monitoring the luminescence from the diamond materials. Graph 700 shows an average of 5 to 15 scans at random locations for each diamond material. As illustrated, the measured luminescence intensity at a wavelength of approximately 908 nm for the carbonate PCD 704 is about 30 percent greater than that of the conventional luminescent nanodiamond powder 702, demonstrating the increased level of luminescence intensity that is emitted by the luminescent diamond material in the form of carbonate PCD as disclosed herein. The measured luminescence intensity at a wavelength of approximately 908 nm for the cobalt PCD 706 is about 8 percent greater than that of the conventional luminescent nanodiamond powder 702. The carbonate PCD used to generate the data in FIG. 7 is in sintered form, i.e., in the form of a sintered body, and is not yet reduced in size to smaller particles or nano-sized particles or grains. As described above, the process of reducing the sintered PCD body to smaller-sized, e.g., nano-sized, diamond particles or grains can subject the diamond material to further plastic deformations, which operates to still further increase the luminescent activity/ intensity in the resulting diamond particles.

Figure 8:
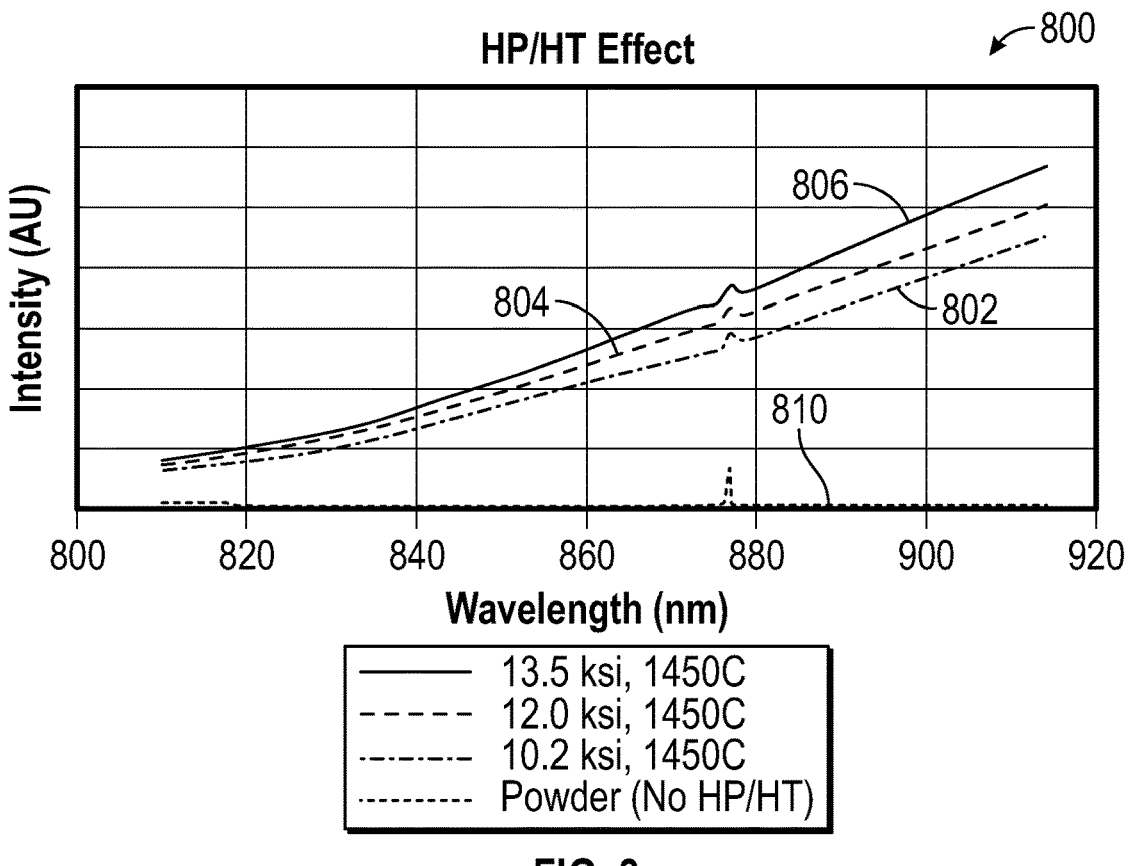
FIG. 8 is a graph illustrating the relative luminescence intensities of luminescent diamond materials as disclosed herein in a sintered state as a function of processing pressures and as related to diamond powder that has not been subjected to high-pressure/high-temperature processing.

FIG. 8 is a graph 800 that illustrates the relative luminescence intensities of different example luminescent diamond materials in the form of cobalt PCD 802, 804 and 806 as a function of different HPHT processing pressures as compared to the precursor diamond powder 810 not subjected to an HPHT process, all within light wavelengths of from about 810 to 915 nm (along the x-axis). In each example, the cobalt PCD was formed from diamond grains or powder having an average particle size of approximately 17 μm, and using approximately 10 weight percent cobalt based on the total weight of the resulting cobalt PCD. The diamond powder 810 not subjected to a HPHT process shows no significant luminescent activity or luminescence intensity. Luminescent diamond formed using a cobalt catalyst and in the form of sintered PCD, i.e., cobalt PCD, shows increasing levels of luminescence intensity with progressively increasing pressure processing conditions, 802 at 10.2 ksi and 1450° C., 804 at 12.0 ksi and 1450° C., and 806 at 13.5 ksi and 1450° C., suggesting an increased level of plastic deformations in the diamond grains produce greater luminescent activity and higher luminescence intensities. The pressure levels of 10.2, 12.0, and 13.5 ksi correspond to hydraulic pressures used to operate the HPHT apparatus. Hydraulic pressure to cell pressure conversion is approximately as follows: 10.2 ksi=6.0 to 6.4 GPa internal cell pressure, 12 ksi=6.9 to 7.3 GPa internal cell pressure, and 13.5 GPa=7.3 to 7.7 GPa internal cell pressure, with the range depending on both the temperature and specific cell design/materials employed. This data shows that the luminescent diamond as disclosed herein in the form of cobalt PCD displays a luminescence intensity that is at least 2 orders of magnitude greater, and in some cases at least 3 orders of magnitude greater, than that of the precursor diamond grains not subjected to the HPHT process. As noted above for the data presented in FIG. 7, the PCD samples being measured are in the form of a fully-sintered body that have not yet been reduced into a desired particle size, e.g., nano-sized diamond particles or grains. As described previously, in some embodiments, the process of reducing particle size: 1) creates more diamond surface area for exposure to the laser illumination under luminescent conditions; and 2) can also subject the diamond material to still further plastic deformations, both of which mechanisms can operate to further increase the luminescent activity and luminescence intensity of the resulting diamond particle material.

In some embodiments, after the diamond precursor material has been subjected to HPHT consolidation conditions/ processing as discussed above, the resulting diamond material is subjected to further treatment(s) for the purpose of further increasing luminescent activity and luminescence intensity. For example, such additional treatment(s) may include subjecting the consolidated diamond material to one or more further HPHT processes, and/or exposing the consolidated diamond material to other treatment techniques/ processes that cause the diamond grains to incur further plastic deformations. The further HPHT processing may be done before or after a sizing reduction. It is to be understood that all such other techniques that operate to cause the diamond material from the HPHT process to undergo further plastic deformations that operate to increase luminescent activity are within the spirit and scope of this disclosure, and may include and not be limited to mechanical collision of the diamond material with another object, substance or material calculated to induce grain fracture and/or plastic deformation. The HPHT diamond material may be subjected to elevated temperatures in order to facilitate vacancies formed during HPHT to migrate to locations adjacent to nitrogen impurities, forming additional nitrogen (N-V and/or N-V-N) defects and/or N3 optical centers. In some embodiments, the HPHT diamond material as disclosed herein may be treated by ion bombardment and/or annealing or other conventional means useful to create additional N-V and/or N-V-N and/or N3 defects, optical centers or sites in the diamond material. Such further treatment(s) may take place in an elevated temperature environment or an ambient temperature environment. Use of charged nitrogen particles, such as contained in a nitrogen plasma chamber may be useful to make a specific balance of $NV^0$ (uncharged nitrogen vacancy) and $NV^-$ (negatively charged nitrogen vacancy) centers. The nature and extent of such treatment is understood to vary depending on the particular diamond material and end-use application, and may include a single treatment or a series/ sequence of similar or different treatments. For example, the N-V center has been found to be very useful as a sensing device for determining the strength of a localized magnetic field. In other cases it may be useful to have both N-V and N-V-N centers active, as well as additional luminescent centers which are active in the infrared region. Also, the type of further treatment(s) that is used may depend on whether the diamond material resulting from the HPHT process one that is sintered and present in the form of PCD or one that is semi-sintered as noted above and present in the form of mechanically combined diamond grains, e.g., where no catalyst material was present during the HPHT process. Such further treatment(s) is believed to increase luminescence intensity by either creating more N-V and/or N-V-N defects or centers, or by exposing more of these N-V and/or N-V-N defects or centers by the creation of additional surface area during the fracture process.

In some embodiments where the luminescent diamond resulting from the HPHT process is in the form of a metal PCD, e.g., cobalt PCD, it may be desired to treat the sintered PCD body to completely or partially remove the metal material therefrom, which may be done by leaching process or other process known in the art to remove the metal catalyst from the PCD to enable use in such those applications where the presence of metal is not desired or permitted, e.g., in biological applications. Also, removing the catalyst material from the PCD weakens the structure of the sintered body making it easier to crush and reduce in size. In some embodiments of luminescent diamond as disclosed herein that is formed using a carbonate catalyst, e.g., carbonate PCD, is that such a metal free PCD is metal free and thus may be used without the need for any catalyst removal in biological end-use applications. It may be helpful to use magnetic separation techniques to ensure that the luminescent diamond material is sufficiently free of metallic catalysts. In some embodiments of luminescent diamond provided in the form of carbonate PCD, a level of luminescence intensity that is substantially higher that than of cobalt PCD (as illustrated in FIG. 7) is obtained, which may result from the higher levels of temperature and pressure used in the HPHT sintering process employed in carbonate PCD, as well as a relative transparency increase and reduced opacity of the carbonate PCD as contrasted with the cobalt PCD as noted above.

Luminescent diamond as disclosed herein may be sized after the HPHT consolidation process to facilitate use in applications calling for smaller-sized diamond particles, e.g., nano-sized particles, such as in biological applications as discussed above. Accordingly, after the luminescent diamond has been consolidated by HPHT processing, it is subjected to a size reducing treatment for purposes of breaking the diamond material into smaller-sized diamond pieces or grains. In some embodiments, the luminescent diamond may be treated to reduce the size to an average diameter of about 1 nm to 1 mm, or from about 5 nm to 200 μm or the like. Examples of useful average particle size ranges include but are not limited to 5 to 100 nm, 100 to 200 nm, 200 to 1000 nm, 0.500 to 20 μm, or 20 to 200 μm. In some embodiments it may be useful for the average particulate size to be 1 μm or larger. The particular process that is used for reducing the size of the diamond material resulting from HPHT processing can and will vary depending on the particular material, e.g., whether the diamond material is in the form of sintered PCD, partially-sintered PCD, or mechanically-combined diamond grains. In some embodiments, the diamond material may be crushed by high-velocity impact with a high-strength target, e.g., one made from tungsten carbide or the like, or by impact with another diamond material, e.g., self-impact under high-velocity conditions. In some embodiments where the diamond material is to be used in biological applications it is desired that the diamond material be reduced to nanosized pieces or particles. The process of reducing or sizing the diamond material may be carried out at an elevated temperature or ambient temperature condition in the event that such helps to make the process easier or in the event that such causes the diamond material to undergo further plastic deformations to further increase luminescent activity and luminescence intensity. Sorting by magnetic or other mechanical technique may be used for purposes of isolating the luminescent diamond particles with cobalt inclusions from luminescent particles free of cobalt inclusions. In some end use applications, the shape of the resulting particulate may be relevant as some cellular structures are sensitive to sharp edges such as those created with fragmented diamond crystals. In these applications, it may be advantageous to employ detonation nanodiamond as the starting material as these particulates are essentially spherical in shape. In some embodiments, treating the material in an oxidizing environment as described previously has been shown to remove 50% or more of the diamond crystals under some conditions, which can be employed to remove sharp edges and increase the sphericity of the particulates. In the powder sizing mentioned above, an adequate definition of particle size can be achieved by employing the approach of equivalent circle of equal projection area as defined by $D_{EQPC}=2\sqrt{A/\pi}$, where $D_{EQPC}$ is the diameter of a circle with the same projected area A as the particle of interest.

As noted briefly above, during the process of reducing diamond material to desired diamond particle sizes, e.g., nano-sized particles, the diamond material can undergo further plastic deformations or fracture, e.g., beyond that which occurred during the HPHT process, causing the luminescent activity and the luminescence intensity of the resulting diamond material to further increase. Thus, the resulting sized diamond particles have a level of luminescence intensity that is greater than that of the diamond material after HPHT processing. Further, if an intermediate treatment as discussed above is carried out between HPHT processing and sizing, there may be two increases in luminescent activity/intensity between the diamond material in a consolidated state during after HPHT processing and the diamond particles after the reducing or sizing process.

Figure 9:
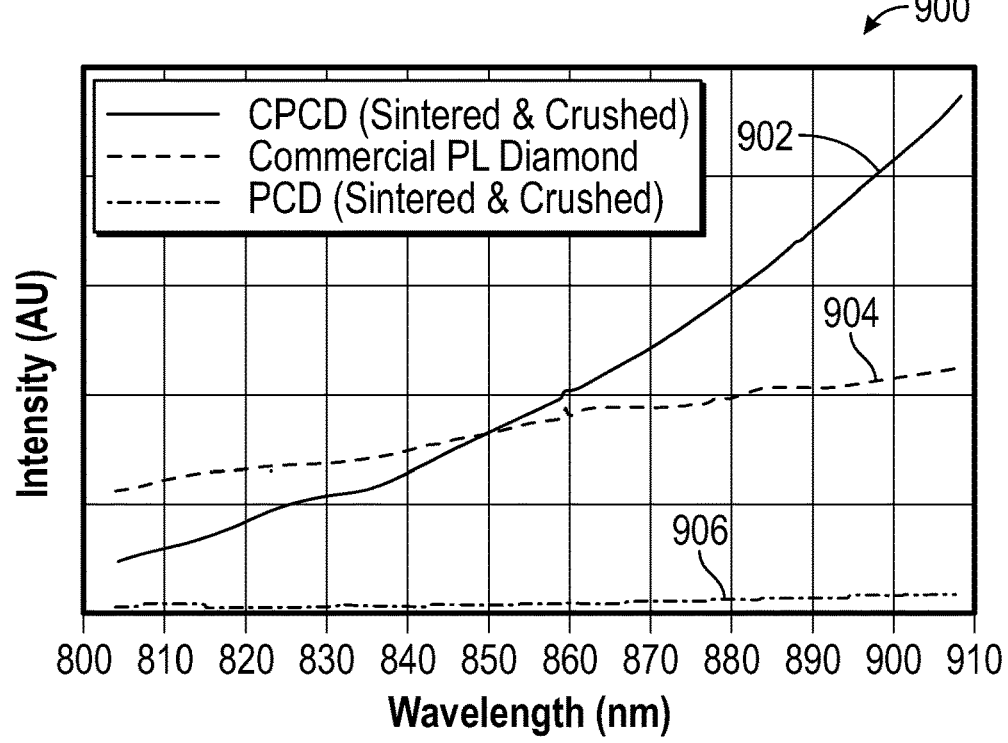
FIG. 9 is a graph illustrating the relative luminescence intensities of luminescent diamond materials as disclosed herein in a crushed state as contrasted with a conventional luminescent nanodiamond.

FIG. 9 is a graph 900 that illustrates the relative differences in luminescence intensity between a luminescent diamond 902 as disclosed herein formed from carbonate PCD that has been reduced in size into diamond particles (which may include some nano-sized particles) as compared to both the conventional luminescent nanodiamond 904 and the cobalt PCD nanodiamond 906 (that has also been reduced in size into diamond particles). In this example, cobalt PCD was formed from diamond grains having an average size of approximately 17 μm, and subjected to a pressure of approximately 11 ksi (6.5 to 6.9 GPa) and a temperature of approximately 1450° C. The resulting cobalt PCD had a cobalt content of approximately 10 percent by weight based on the total weight of the cobalt PCD. In this example, the carbonate PCD was formed from diamond grains having an average size of approximately 10 μm, and subjected to a pressure of approximately 13.5 ksi (7.3 to 7.7 GPa) and a temperature of approximately 2200° C. The resulting carbonate PCD had a magnesium carbonate content of approximately 6 percent by weight based on the total weight of the carbonate PCD.

Figure 10:
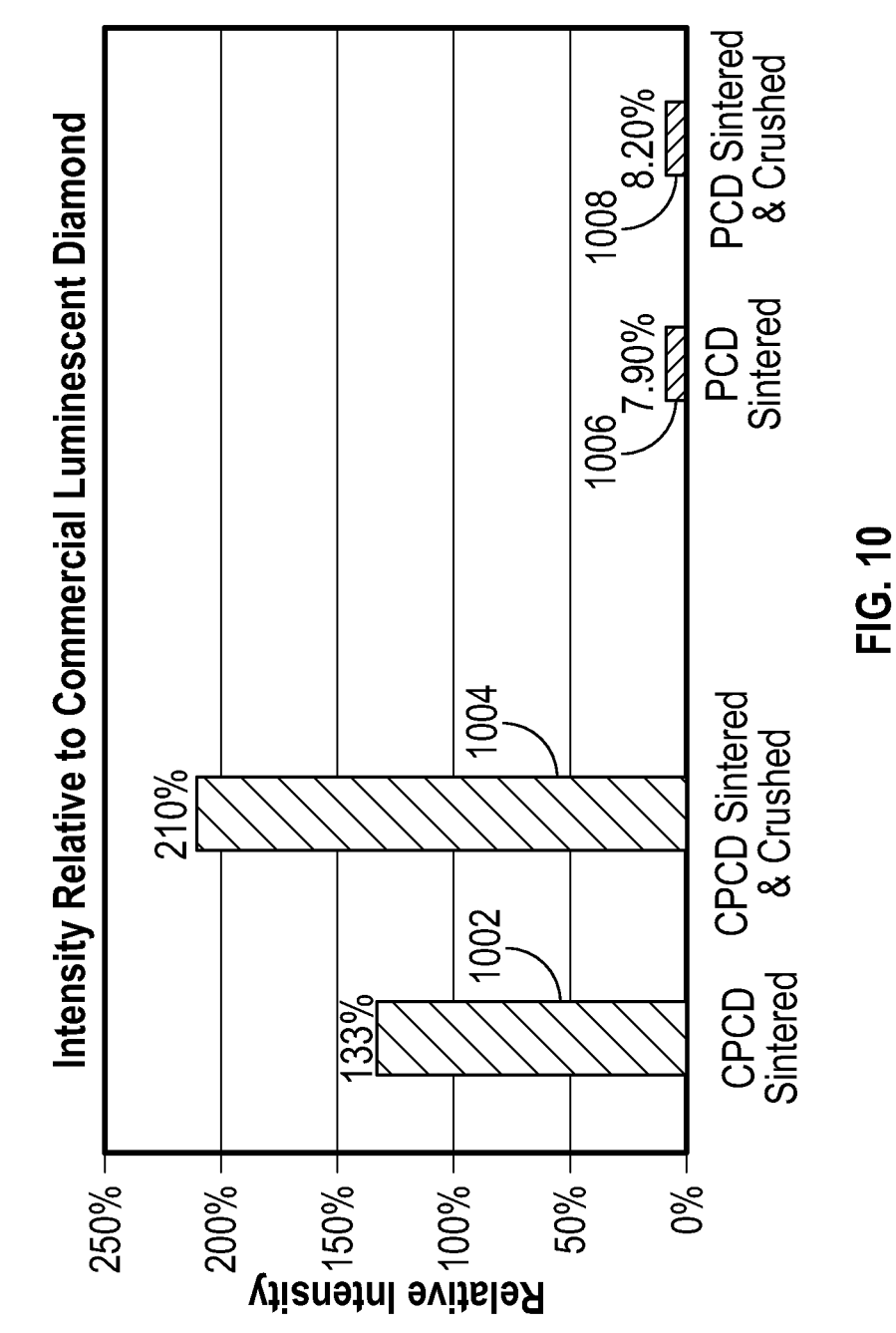
FIG. 10 is a bar chart illustrating relative luminescence intensities of luminescent diamond materials as disclosed herein in both sintered and crushed states as compared to conventional luminescent nanodiamond.

FIG. 10 is a graph 1000 that illustrates the differences in luminescence intensities of the carbonate PCD in both a sintered 1002 and crushed state 1004, and the cobalt PCD in both a sintered 1006 and crushed state 1008 relative to the conventional luminescent nanodiamond (which is denoted by a relative luminescence intensity of 100 percent). In this example, the cobalt PCD was formed from diamond grains having an average size of approximately 17 μm, and subjected to a pressure of approximately 11 ksi and a temperature of approximately 1450° C. The resulting cobalt PCD had a cobalt content of approximately 10 percent by weight based on the total weight of the cobalt PCD. In this example, the carbonate PCD was formed from diamond grains having an average size of approximately 10 μm, and subjected to a pressure of approximately 13.5 ksi (7.3 to 7.7 GPa) and a temperature of approximately 2200° C. The resulting carbonate PCD had a magnesium carbonate content of approximately 6 percent by weight based on the total weight of the carbonate PCD. In some embodiments, the luminescence intensity of the crushed carbonate PCD diamond material may increase by about 50 percent or more as compared to the sintered carbonate PCD diamond material, and the luminescence intensity of the crushed cobalt PCD diamond may increase by about 4 percent or more as compared to the sintered cobalt PCD diamond. With reference to FIG. 10, the sintered carbonate PCD 1002 has a luminescence intensity that is about 30 percent greater than the conventional luminescent nanodiamond, the crushed carbonate PCD 1004 has a luminescence intensity that is about 100 percent greater than the conventional luminescent diamond, the sintered cobalt PCD 1006 has a luminescence intensity that is about 7.9 percent that of the conventional luminescent diamond, and the crushed cobalt PCD 1008 has a luminescence intensity that is about 8.2 percent that of the conventional luminescent diamond.

It is to be understood that the amount of luminescence intensity increase may vary depending on such factors as the particular type of luminescent diamond material, the technique or process used for reducing and the ultimate size of the luminescent diamond particles, other process treatments employed such as heat treatment in vacuum conditions and/or air heat treatment (as discussed above with reference to FIG. 5). In addition to displaying a much greater luminescence intensity than that of the conventional luminescent nanodiamond, the crushed carbonate luminescent diamond as measured at 908 nm maintained its luminescence intensity for a longer duration of time than that of the conventional luminescent nanodiamond. For example, the crushed carbonate luminescent diamond appeared to be reaching a limiting luminescence intensity value close to about 0.97 at ten scans, while at the same number of scans the conventional luminescent nanodiamond was below 0.93 with a still rapidly decreasing luminescence intensity slope.

As noted above, luminescent diamond may be formed using a non-catalyst material that does not promote intercrystalline diamond bonding during the HPHT process to result in a body that is free (e.g., substantially free) of intercrystalline diamond bonding. Such materials may be considered pressure transfer media as they operate to facilitate diamond-to-diamond mechanical combination during the HPHT process. Examples of pressure transfer media materials useful for making luminescent diamond include and are not limited to carbonates, nitrates, sulfates, phosphates, chlorates, perchlorates, acetates, chromates, oxalates, sulfides, ammonium compounds, hydroxides, oxides, cyanides, cyanates, dichromates, halides, chlorides, or combinations thereof. The pressure transfer media may be selected from materials that promote diamond growth but do not promote intercrystalline diamond bonding, such as sodium carbonate ($Na_2CO_3$) and other alkali metal carbonate materials or compounds, or other functionally similar materials. The pressure transfer media may selected from materials that are not a catalyst for diamond synthesis such as sodium chloride (NaCl) and other chloride materials or compounds, or other functionally similar materials. In some embodiments, it is desired that material selected as the pressure transfer media be water soluble, acid soluble, or base soluble to facilitate removal from the luminescent diamond formed by HPHT processing by water, acid or base washing. The pressure transfer media can be a liquid or a solid at room temperature and at one atmosphere. In some embodiments, the pressure transfer media may be provided in the form of a solid for easy handling during loading of the HPHT container. Further, while different types of pressure transfer media have been described, it is to be understood that the pressure transfer media that is used may be of a single phase, such as NaCl or $Na_2CO_3$, or the pressure transfer media may comprise two or more phases of different materials, such as NaCl—$Na_2CO_3$ or NaCl—KCl—LiCl mixtures or the like. The use of a two or more phase pressure transfer media mix composition enables one to widely vary and control the desired melting point of the pressure transfer media during the HPHT process, e.g., to ensure that the pressure transfer media is in a liquid state during HPHT processing to fill gaps (e.g., most or all gaps) between the diamond particles to thereby minimize or eliminate diamond surface graphitization.

In some embodiments, luminescent diamond may be made in a manner similar to that disclosed above, wherein a volume of nano- or micron-sized diamond grains or powder is premixed with a pressure transfer media such as $Na_2CO_3$ and/or NaCl powder. When subjected to the HPHT process, the pressure transfer media functions to transfer the pressure to the diamond particles and also fills voids between the diamond particles to minimize or eliminate diamond graphitization. During the HPHT process a shear load is applied to the diamond particles through diamond-to-diamond particle point contacts, which shear load functions to cause plastic deformation at high temperatures that creates the N-V and/or N-V-N defects and/or N3 optical centers. In some embodiments, the volume percent of the precursor diamond grains is controlled to ensure the generation of such point contacts and resulting shear load. In some embodiments, the amount of the precursor diamond grains used is greater than about 20 volume percent, and in some embodiments, greater than about 50 volume percent based on the total volume of the diamond grain and pressure transfer media mixture. In some embodiments, the amount of pressure transfer media may also be controlled to ensure that it fills the open space between diamond particles to minimize or prevent diamond surface graphitization at high temperatures. In some embodiments, the amount of the pressure transfer media used is greater than about 5 volume percent, and in some embodiments greater than about 10 volume percent base on the total volume of the diamond grain and pressure transfer media mixture.

While the method of making luminescent diamond disclosed above involves the premixing of diamond grains and the pressure transfer media, it is to be understood the diamond grains can be loaded into the HPHT container, e.g., a refractory metal capsule, without being premixed with the pressure transfer media. In such example, the pressure transfer media may be provided in the form of a layer or body that is placed adjacent the diamond grains inside of container. At elevated temperature during the HPHT process, the pressure transfer media melts and infiltrates into the volume of diamond grains by the applied pressure. In some embodiments, the layer or body of pressure transfer media is of sufficient volume to ensure full infiltration of the diamond grain volume.

Figure 11A:
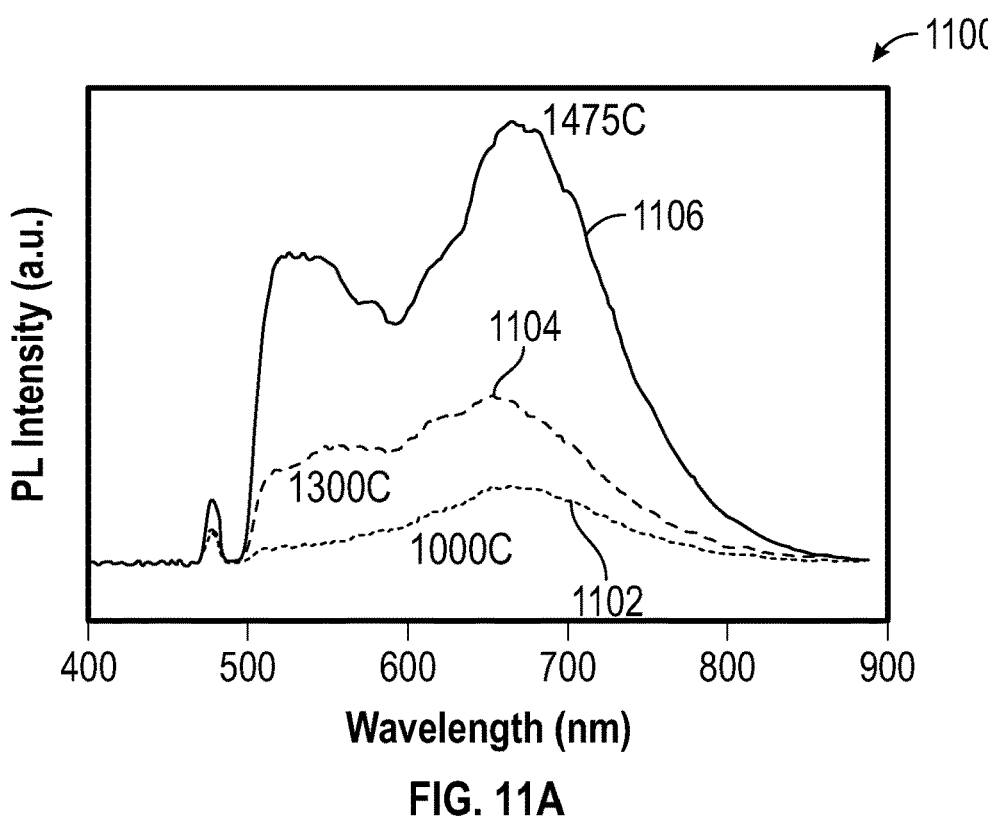
FIGS. 11A and 11B are graphs illustrating the relative luminescence intensity and wavelength information for luminescent diamond materials as disclosed herein as a function of different high-pressure/high-temperature treatment temperatures and made using a carbonate pressure transfer media.
Figure 11B:
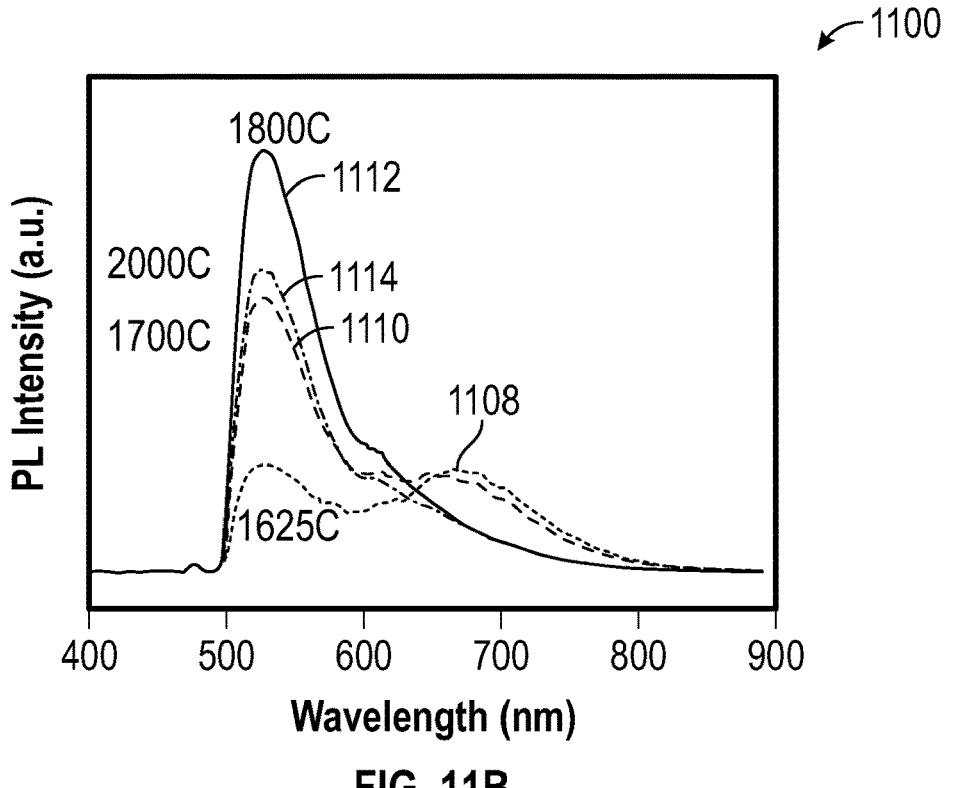

FIGS. 11A and 11B are graphs 1100 that show relative luminescence intensities and wavelength spectra for luminescent diamond as disclosed herein made using a $Na_2CO_3$ pressure transfer media at HPHT conditions as described above, and as excited by a 473 nm blue laser. The luminescent diamond is in the form of a mechanically interlocked diamond body comprising approximately 70 percent by volume 100 nanometer sized diamond grains and approximately 30 percent by volume pressure transfer media based on the total volume of the diamond body. The luminescent diamond was formed by HPHT process at a pressure of approximately 7.3 to 7.7 GPa, and at different temperature conditions of 1000° C. 1102, 1300° C. 1104, 1475° C. 1106 (as shown in FIG. 11A), 1625° C. 1108, 1700° C. 1110, 1800° C. 1112, and 2000° C. 1114 (as shown in FIG. 11B). Luminescence in the red wavelength spectrum (675 nm) occurs at HPHT temperature at and above 1000° C. 1102, and luminescence in the green wavelength spectrum (525 nm) starts to be detected when the HPHT temperature reaches about 1300° C. 1104. At an HPHT temperature of about 1625° C. 1108 the luminescence intensity in the green and red wavelength spectrums are almost the same. With a further increase in HPHT processing temperature, luminescence intensity in the red wavelength spectrum becomes very weak at approximately 1700° C. 1110. Maximum luminescence intensity in the green wavelength spectrum is achieved at about 1800° C. 1112. At approximately 2000° C. 1114, luminescence intensity in the green wavelength spectrum starts to drop and is believed due to N-V-N transformation to N3 optical centers. At HPHT processing temperatures greater than about 2000° C. 1114 the prevalence of the N3 optical centers gives rise to luminescence in the violet-blue wavelength spectrum (415 nm), and luminescence in the blue wavelength spectrum (450 nm). Thus, information presented in FIGS. 11A and 11B demonstrates that the HPHT processing temperature has a distinct influence on the luminescence intensity and wavelength spectrum of the resulting luminescent diamond, which may be in one or more of the red, green, violet-blue, and blue wavelength spectrums.

NaCl is a pressure transfer media that is not a catalyst for diamond synthesis. At about 6 GPa, its melting point is about 1500° C., and it is a solid below 1500° C. Although diamond powder may be mixed together with solid NaCl powder for HPHT treatment, diamond surfaces may still be slightly graphitized at high temperature before the NaCl melts and is able to fill all or substantially all of the gaps between diamond particles. Thus, after HPHT processing using NaCl as the pressure transfer media the resulting luminescent diamond may have a slightly darkened appearance due to the presence of such diamond surface graphitization. In some embodiments, luminescent diamond as disclosed herein made using the pressure transfer media described above may have a total graphite content present as diamond surface graphitization of less than about 5 percent by weight, and less than about 2 percent by weight based on the total weight of the luminescent diamond.

In an effort to boost the luminescence intensity of luminescent diamond having diamond surface graphitization, it may be desired to treat the luminescent diamond after HPHT processing. In some embodiments, the luminescent diamond may be subjected to thermal annealing treatment such as annealing in air at a temperature of approximately 525° C. In some embodiments, luminescent diamond is made by HPHT process at a temperature of approximately 1475° C. using NaCl. FIG. 12A shows the resulting luminescent material 1200 before annealing treatment, and FIG. 12B shows the resulting luminescent material 1202 after being subjected to an air annealing treatment at a temperature of approximately 525° C. for a period of approximately 60 minutes, demonstrating the effect of the annealing treatment in removing graphite and resulting in the relative visual lightening of the luminescent material. FIG. 13 is a graph 1300 that shows relative luminescence intensities and wavelength spectra for the luminescent diamond formed using the NaCl pressure transfer media as described above and as excited by a 473 nm blue laser. Both the unannealed luminescent diamond 1302 (1200 of FIG. 12A) and the annealed luminescent diamond 1304 (1202 of FIG. 12B) were tested, and before testing each was subjected to water washing in boiling water to remove the NaCl from the luminescent diamond. As shown, the unannealed luminescent diamond 1302 displayed luminescence in both the green wavelength spectrum and the red wavelength spectrum with somewhat similar intensities. The annealed luminescent diamond 1304 displayed luminescence in both the green wavelength spectrum and the red wavelength spectrums, and the luminescence intensity in the green wavelength spectrum was about two times that of the unannealed luminescent diamond, and the luminesce intensity in the red wavelength spectrum was greater than that in the red wavelength spectrum and about three times that of the unannealed luminescent diamond. Thus, the information shown in FIG. 13 illustrates the relative increases in luminescence intensity for luminescent diamond made using NaCl resulting from the removal of graphite by annealing treatment.

Figure 14:
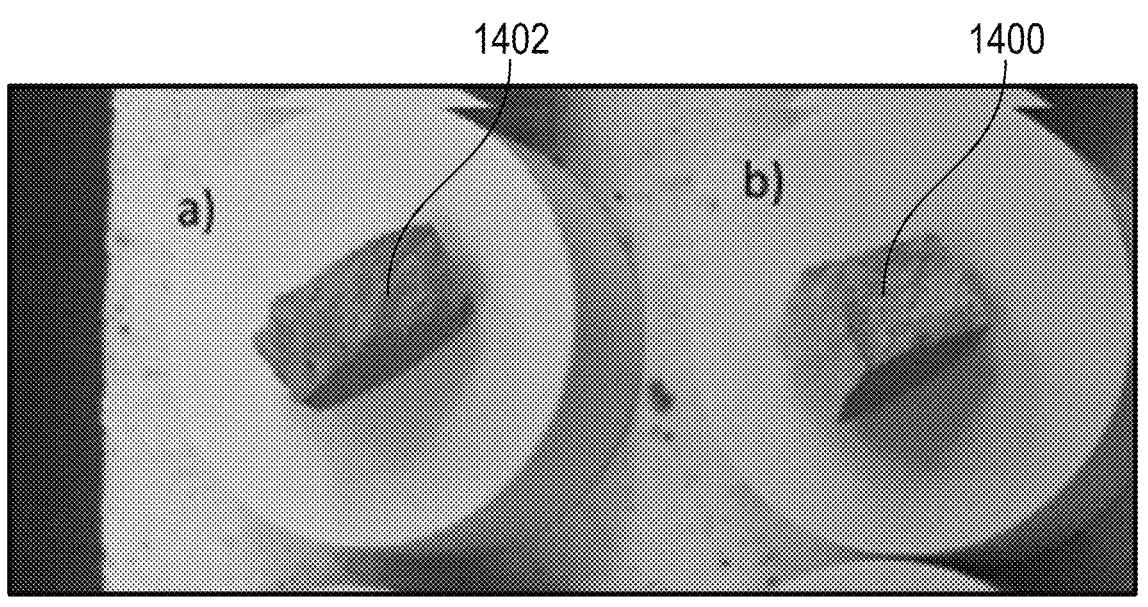
FIG. 14 is a photograph of two different luminescent diamond materials as disclosed herein, wherein one was formed using a carbonate pressure transfer media, and the other was formed using a chloride pressure transfer media.

Luminescent diamond made using $Na_2CO_3$ as the pressure transfer media premixed with the precursor diamond powder and subjected to HPHT conditions of about 7.3 to 7.7 GPa and a temperature of approximately 1625° C. FIG. 14 shows the resulting luminescent material 1400 formed from the $Na_2CO_3$ pressure transfer media as described above as compared to the unannealed luminescent material 1402 (1200 of FIG. 12A) formed from the NaCl pressure transfer media as described above. Comparatively, the luminescent material 1400 made using $Na_2CO_3$ is relatively lighter in appearance than the luminescent material 1402 made using NaCl, thereby indicating a lesser degree of diamond surface graphite formation in the luminescent material made using $Na_2CO_3$.

Figure 15:
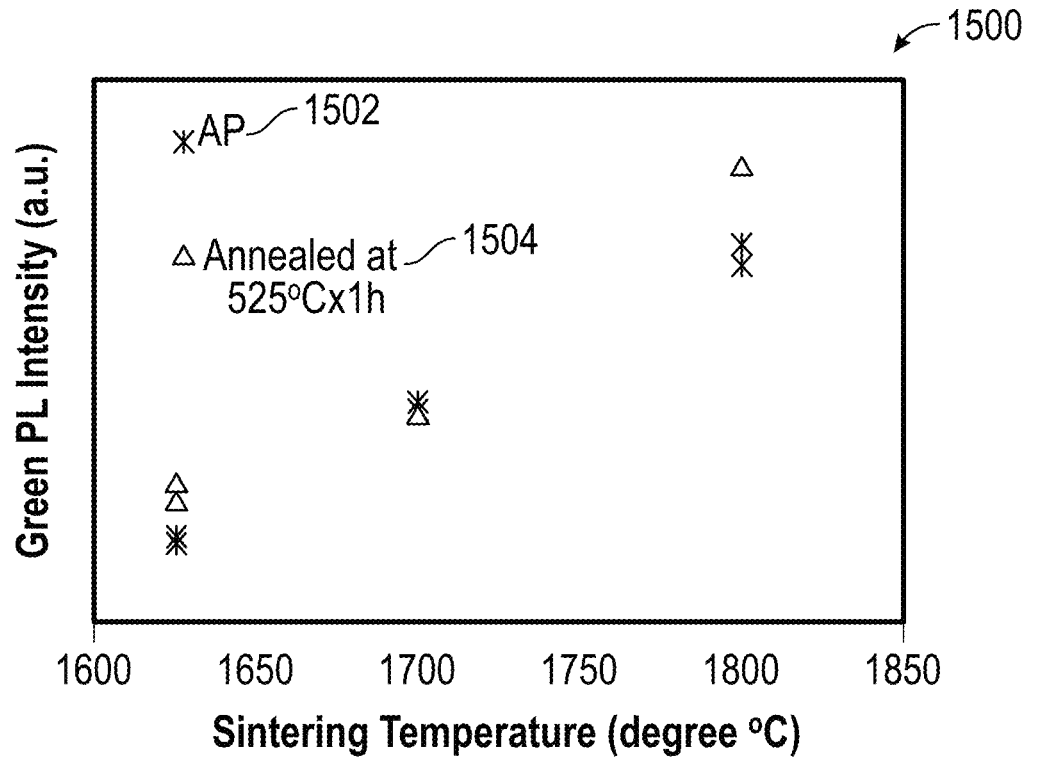
FIG. 15 is a graph illustrating the relative luminescence intensity and wavelength information for luminescent diamond materials formed using a carbonate pressure transfer media as disclosed herein, after being subjected to either annealing or washing process.

FIG. 15 is a graph 1500 that shows relative luminescence intensities in the green wavelength spectra for the luminescent diamond formed from the $Na_2CO_3$ pressure transfer media that was also the subject of FIG. 11B, and that was formed by HPHT process at the different temperature conditions of 1625° C., 1700° C., and 1800° C. Each of the different luminescent diamond samples were subjected to a washing treatment 1502 in boiling water to remove the $Na_2CO_3$ and then tested. The washed samples were then subjected to air annealing 1504 at 525° C. for a period of approximately 60 minutes. The so-treated luminescent diamond samples were then tested for luminescence intensity in the green wavelength spectrum as excited by a 473 nm blue laser. As illustrated in FIG. 15, the luminescent samples for a given HPHT treatment temperature did not show a significant change in the luminescence intensity when annealed as compared to being washed. It is theorized that this result may be due to the relatively low amount of diamond surface graphitization present in the luminescent diamond made with $Na_2CO_3$ as compared with the luminescent diamond made with NaCl as described above. Further, it is believed that other types of pressure transfer media, such as nitrates or the like, may also operate to remove the graphite layer formed on the diamond surface during the HPHT process, possibly avoiding the need to perform post HPHT treatments such as annealing or other processes to otherwise remove graphite to improve luminescence intensity.

Figure 16:
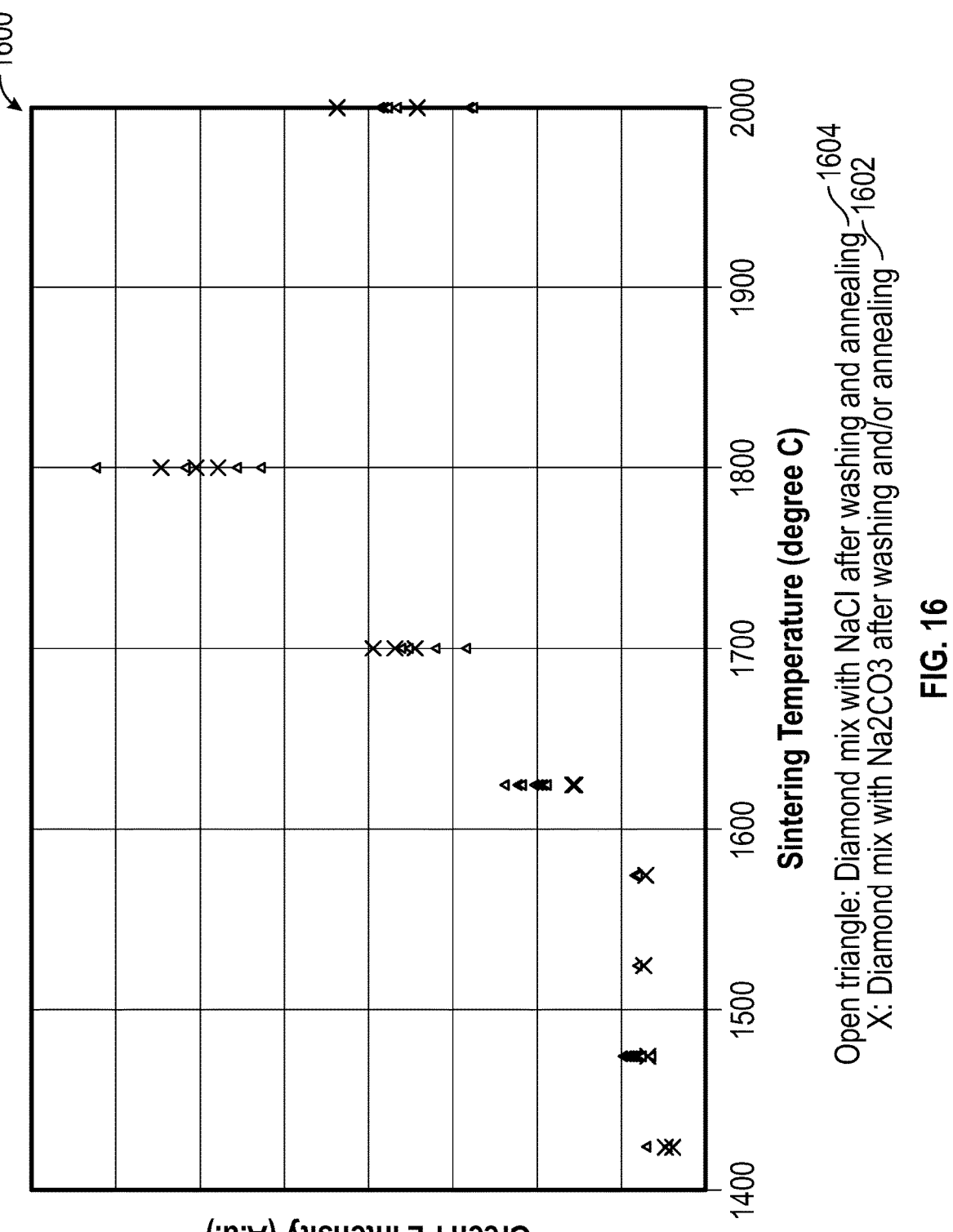
FIG. 16 is a graph illustrating the relative luminescence intensity and wavelength information for luminescent diamond materials as disclosed herein formed from a carbonate pressure transfer media and formed from a chloride pressure transfer media, and subjected to washing and annealing processes.

FIG. 16 is a graph 1600 that shows relative luminescence intensities within the green wavelength spectrum for both the luminescent diamond 1602 formed by HPHT process using the $Na_2CO_3$ pressure transfer media, and the luminescent diamond 1604 formed by HPHT process using the NaCl pressure transfer media at the same different HPHT temperature conditions. The luminescent diamond made from the NaCl pressure transfer media was subjected to washing and annealing process as described above. The luminescent diamond made from the $Na_2CO_3$ pressure transfer media was subject to washing and/or annealing as described above. As illustrated, the luminescence intensity is very similar for both of the luminescent diamond materials at each of the different HPHT process temperatures. FIG. 16 also shows the same trend illustrated in FIG. 11B, of increasing luminescence intensity in the green wavelength spectrum at or above 1700° C., with a maximum at about 1800° C., and a relatively reduced luminescence intensity with increased HPHT process temperature to about 2000° C.

For use of the luminescent diamond as disclosed herein in certain downstream applications such as biological uses, it may be desired that the luminescent diamond particles, e.g., nanodiamond, be further treated or functionalize to adapt the material for its intended use. The manner and type of treatment that may be used to functionalize the luminescent diamond material as disclosed herein is understood to vary depending on the particular end-use application. However, an example functionalizing process may be one that involves oxygen termination along the diamond surface to render the diamond surface hydrophilic, and may be established through a range of surface oxidation procedures. Such oxygen termination functionalization may include providing a mixture of =O, —OH, —COOH, or —C—O—C— groups on the surface. Other surface terminations may include hydrogen termination, halogenation, thermal annealing to create double bonds, and reduction to OH termination. A further type of functionalization may involve the grafting or attachment of certain molecules to the surface of the diamond treated as treated in the manner noted to promote such attachment, where such molecules are selected to readily react with different biomolecules. A still further type of functionalization may include biolabeling which may take place though an electrostatic (non-covalent) or covalently bonded attachment between the diamond particle and biomolecules. These are but a few methods in which luminescent diamond as disclosed herein may be functionalized for use in biological applications, and it is to be understood that other known approaches and techniques useful for functionalizing luminescent diamond for a particular biological use is within the scope and spirit of this disclosure.

Although but a few example embodiments of luminescent diamond have been described in detail above, those skilled in the art will readily appreciate that many modifications are possible in the example embodiments without materially departing from this invention. For example, luminescent diamond as disclosed herein has been presented in the context of a biological end-use application. It is to be understood that luminescent diamond as disclosed herein may be use in end-use applications other than biological where a desired improved level of luminescence intensity is useful or beneficial. Other potential uses of luminescent diamond include but are not limited to usage in magnetic sensors, high resolution thermography, microscopic sensor arrays, anti-counterfeiting measures, ion concentration monitoring, membrane potential measurement, optical trapping, and strain/pressure sensors. Therefore, it is understood that luminescent diamond as disclosed herein is not intended to be limited to one particular end use application. It should be understood that references to "one embodiment," "an embodiment," "an example" of the present disclosure or the like are not intended to be interpreted as excluding the existence of additional embodiments that also incorporate the recited features. For example, any element or feature described in relation to an embodiment herein may be combinable with any element or feature of any other embodiment described herein.

Accordingly, all such modifications and end-use applications of luminescent diamond are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke means plus function type claiming for any limitations of any of the claims herein, except for those in which the claim expressly uses the words 'means for' together with an associated function.

What is claimed is:

1. A luminescent diamond material comprising diamond particles that are mechanically interlocked together and combined with a pressure transfer media, wherein the luminescent diamond material is made by a high-pressure/high-temperature process, wherein a temperature of the high-pressure/high-temperature process is from about 1300° C. to about 2500° C. and a pressure of the high-pressure/high-temperature process is from about 3.0 GPa to about 10 GPa, wherein the diamond particles include diamond grains that have undergone plastic deformation, wherein the luminescent diamond material displays a level of luminescence intensity in one or more combinations of blue, violet-blue, red, or green wavelength spectrums that is greater than that of a precursor diamond material used to form the luminescent diamond material, wherein the diamond particles are free of intercrystalline bonded diamond, wherein the luminescent diamond material comprises greater than about 20 percent by volume diamond and greater than about 5 percent by volume pressure transfer media based on the total volume of the luminescent diamond material, and wherein the pressure transfer media comprises a non-catalyst material that does not promote intercrystalline diamond bonding during the high-pressure/high-temperature process.

2. The luminescent diamond material as recited in claim 1, wherein the pressure transfer media is selected from the group consisting of carbonates, nitrates, sulfates, phosphates, chlorates, perchlorates, acetates, chromates, oxalates, sulfides, ammonium compounds, hydroxides, oxides, cyanides, cyanates, dichromates, halides, and combinations or mixtures thereof.

3. The luminescent diamond material as recited in claim 1, wherein the pressure transfer media is selected from the group consisting of water soluble, acid soluble, and base soluble materials.

4. The luminescent diamond material as recited in claim 1, wherein the pressure transfer media is a chloride.

5. The luminescent diamond material as recited in claim 1, comprising greater than about 50 percent by volume diamond and greater than about 10 percent by volume pressure transfer media based on the total volume of the luminescent diamond material.

6. The luminescent diamond material as recited in claim 1 comprising a total graphite content of less than about 5 percent by weight after being made by the high-pressure/high-temperature process without further treatment.

7. The luminescent diamond material as recited in claim 1, wherein the luminescent diamond material displays a luminescence intensity in the green spectrum that is greater than in the red spectrum.

8. The luminescent diamond material as recited in claim 1, wherein the luminescent diamond material displays a luminescence intensity in the red spectrum that is greater than that in the green spectrum.

9. The luminescent diamond material as recited in claim 1, wherein the luminescent diamond material displays a luminescence intensity in the red spectrum that is approximately the same as that in the green spectrum.

10. A method for making luminescent diamond comprising subjecting a volume of precursor diamond grains in the presence of a pressure transfer media to a high-pressure/high-temperature condition at an elevated temperature greater than about 900° C. and a pressure greater than about 3.0 GPa to cause the diamond grains to undergo plastic deformation to produce nitrogen vacancy defects in the diamond grains, wherein the pressure transfer media is placed adjacent the volume of diamond grains before the high-pressure/high-temperature condition, wherein the pressure transfer media is selected from the group consisting of chlorides, carbonates, nitrates, sulfates, phosphates, chlorates, perchlorates, acetates, chromates, oxalates, sulfides, ammonium compounds, hydroxides, oxides, cyanides, cyanates, dichromates, halides, and combinations thereof, wherein a resulting diamond material displays a level of luminescence intensity in one or combinations of violet-blue, blue, red, and green wavelength spectrums that is greater than that of the precursor diamond grains, and wherein the resulting diamond material is free of inter-crystalline bonded diamond.

11. The method as recited in claim 10, wherein the pressure transfer media does not promote intercrystalline diamond bonding during the high-pressure/high-temperature condition.

12. The method as recited in claim 10, wherein the pressure transfer media is a chloride.

13. The method as recited in claim 10, wherein the pressure transfer media melts and fills the interstitial pores within the volume of diamond grains during the high-pressure/high-temperature condition at the elevated temperature.

14. The method as recited in claim 10, wherein after the high-pressure/high-temperature condition, the resulting diamond material comprises diamond particles that are mechanically interlocked together.

15. The method as recited in claim 10, wherein after the high-pressure/high-temperature condition, the resulting diamond material comprises greater than about 20 percent by volume diamond and greater than about 5 percent by volume pressure transfer media based on the total volume of the diamond material.

16. The method as recited in claim 10, wherein after the high-pressure/high-temperature condition, the resulting diamond material comprises greater than about 50 percent by volume diamond and greater than about 10 percent by volume pressure transfer media based on the total volume of the diamond material.

17. The method as recited in claim 10, wherein the pressure transfer media is soluble in acid, water, or base.

18. The method as recited in claim 10, comprising, after the high-pressure/high-temperature condition, washing the resulting diamond material to remove all or a portion of the pressure transfer media therefrom.

19. The method as recited in claim 10, wherein during the high-pressure/high-temperature condition, includes an oxi-dizing pressure transfer media to remove graphite formed during the high-pressure/high-temperature condition.

20. The method as recited in claim 10, wherein the resulting diamond material has a total graphite content of less than about 5 percent by weight based on the total weight of the diamond material.

21. A luminescent diamond material comprising diamond particles that are mechanically interlocked together and combined with a pressure transfer media, wherein the luminescent diamond material is made by a high-pressure/high-temperature process, wherein a temperature of the high-pressure/high-temperature process is about 2200° C. and a pressure of the high-pressure/high-temperature process is from about 7.3 GPa to about 7.7 GPa, wherein the diamond particles include diamond grains that have undergone plastic deformation, wherein the luminescent diamond material displays a level of luminescence intensity in one or more combinations of blue, violet-blue, red, or green wavelength spectrums that is greater than that of a precursor diamond material used to form the luminescent diamond material, wherein the diamond particles are free of intercrystalline bonded diamond, wherein the luminescent diamond material comprises greater than about 20 percent by volume diamond and greater than about 5 percent by volume pressure transfer media based on the total volume of the luminescent diamond material, wherein the pressure transfer media comprises a non-catalyst material that does not promote intercrystalline diamond bonding during the high-pressure/high-temperature process, and wherein the non-catalyst material is a chloride, wherein the luminescent diamond material comprises approximately 8 percent by weight magnesium carbonate, and wherein the diamond grains have an average grain size of about 2 μm.

* * * * *